US009947919B2

United States Patent
Phillips et al.

(10) Patent No.: US 9,947,919 B2
(45) Date of Patent: Apr. 17, 2018

(54) CARBON FIBER ZINC NEGATIVE ELECTRODE

(75) Inventors: Jeffrey Phillips, La Jolla, CA (US); Samaresh Mohanta, San Diego, CA (US); Deepan Bose, San Diego, CA (US); Cecilia Maske, San Diego, CA (US)

(73) Assignee: ZincFive Power, Inc., Tualatin, OR (US)

( * ) Notice: Subject to any disclaimer, the term of this patent is extended or adjusted under 35 U.S.C. 154(b) by 318 days.

(21) Appl. No.: 12/852,345

(22) Filed: Aug. 6, 2010

(65) Prior Publication Data

US 2011/0033747 A1    Feb. 10, 2011

Related U.S. Application Data

(60) Provisional application No. 61/232,271, filed on Aug. 7, 2009.

(51) Int. Cl.
*H01M 10/24* (2006.01)
*H01M 4/24* (2006.01)
*H01M 4/62* (2006.01)
*H01M 10/30* (2006.01)
*H01M 4/02* (2006.01)

(52) U.S. Cl.
CPC .......... *H01M 4/244* (2013.01); *H01M 4/625* (2013.01); *H01M 10/24* (2013.01); *H01M 10/30* (2013.01); *H01M 2004/025* (2013.01); *H01M 2004/027* (2013.01)

(58) Field of Classification Search
CPC ........ H01M 4/244; H01M 4/32; H01M 4/625; H01M 4/628

USPC ............... 429/206, 215, 223, 229, 232, 250
See application file for complete search history.

(56) References Cited

U.S. PATENT DOCUMENTS

| | | | |
|---|---|---|---|
| 4,810,600 A * | 3/1989 | Periard et al. ............... 429/224 |
| 5,741,588 A * | 4/1998 | Ford et al. ................... 428/367 |
| 6,605,386 B1 * | 8/2003 | Kasamatsu et al. ....... 429/218.1 |
| 6,797,433 B2 | 9/2004 | Phillips |
| 6,801,017 B2 | 10/2004 | Phillips |
| 6,811,926 B2 | 11/2004 | Phillips |
| 6,818,350 B2 | 11/2004 | Phillips |
| 7,550,230 B2 | 6/2009 | Phillips et al. |

(Continued)

FOREIGN PATENT DOCUMENTS

| CN | 88100116 A | 7/1988 |
|---|---|---|
| CN | 1871725 A | 11/2006 |

(Continued)

OTHER PUBLICATIONS

International Search Report and Written Opinion dated Jan. 18, 2011, from PCT Appl. No. PCT/US2010/044773.

(Continued)

*Primary Examiner* — Tracy Dove
(74) *Attorney, Agent, or Firm* — Weaver Austin Villeneuve & Sampson LLP

(57) ABSTRACT

The conductivity of a zinc negative electrode is enhanced through use of surfactant-coated carbon fibers. Carbon fibers, along with other active materials such as bismuth oxide, zinc etc., form an electronically conductive matrix in zinc negative electrodes. Zinc negative electrodes as described herein are particularly useful in nickel zinc secondary batteries.

8 Claims, 17 Drawing Sheets

(56) References Cited

U.S. PATENT DOCUMENTS

| | | |
|---|---|---|
| 2002/0182501 A1 | 12/2002 | Phillips |
| 2004/0076863 A1* | 4/2004 | Baars et al. ............... 429/26 |
| 2005/0064292 A1 | 3/2005 | Phillips |
| 2006/0240317 A1 | 10/2006 | Phillips et al. |
| 2007/0015053 A1* | 1/2007 | Morris ................. 429/212 |
| 2007/0122712 A1* | 5/2007 | Kang et al. ............ 429/232 |
| 2008/0226976 A1 | 9/2008 | Stimits |
| 2008/0305389 A1 | 12/2008 | Arora et al. |

FOREIGN PATENT DOCUMENTS

| | | |
|---|---|---|
| CN | 1898820 A | 1/2007 |
| CN | 101159326 A | 4/2008 |
| JP | S55-019799 A | 2/1980 |
| JP | 58 163161 | 9/1983 |
| JP | 58 163172 | 9/1983 |
| JP | 58163172 | 9/1983 |
| JP | 59-033756 A | 2/1984 |
| JP | S63-126164 A | 5/1988 |
| JP | H01-209664 A | 8/1989 |
| JP | H02-306538 A | 12/1990 |
| JP | H04-121961 A | 4/1992 |
| JP | H05-151958 A | 6/1993 |
| JP | H06-508716 A | 9/1994 |
| JP | H07-065854 A | 3/1995 |
| JP | H09-283150 A | 10/1997 |
| JP | H11-339847 A | 12/1999 |
| JP | 2004-526286 A | 8/2004 |
| JP | 2006-179430 A | 7/2006 |
| JP | 2006-520082 | 8/2006 |
| JP | 2006-302904 A | 11/2006 |
| KR | 10-1998-0030975 | 7/1998 |
| KR | 10-0432056 | 5/2004 |
| WO | WO1997/017737 | 5/1997 |
| WO | WO 02/039517 | 5/2002 |
| WO | WO 02/039520 | 5/2002 |
| WO | WO 02/039521 | 5/2002 |
| WO | WO 02/039534 | 5/2002 |
| WO | WO 02/075830 | 9/2002 |
| WO | WO 05020353 | 3/2005 |
| WO | WO 06116496 | 11/2006 |
| WO | WO 2008/100831 | 8/2008 |
| WO | WO2011/017655 A1 | 2/2011 |

OTHER PUBLICATIONS

Japanese Office Action dated Jun. 3, 2014 for JP Application No. 2012-523988.
Japanese Office Action dated Jun. 13, 2014 for JP Application No. 2012-523988.
Japanese Office Action dated Jan. 28, 2014 for JP Application No. 2012-523988.
Chinese Office Action dated Mar. 5, 2014 for CN Application No. 201080038490.4.
International Preliminary Report on Patentability dated Feb. 16, 2012 from PCT Appl. No. PCT/US2010/044773.
Chinese Office Action dated Dec. 23, 2014 for CN Application No. 201080038490.4.
Chinese Office Action dated Nov. 16, 2015 for CN Application No. 201080038490.4.
Chinese Office Action dated May 21, 2015 for CN Application No. 201080038490.4.
Korean Office Action dated Aug. 30, 2016 for KR Application No. 10-2012-7005886.
Chinese Notification of Reexamination Office Action dated Jun. 8, 2016 for CN Application No. 201080038490.4.
Chinese Office Action (Reexamination Decision) dated Jan. 6, 2017 for CN Application No. 201080038490.4.
European Office Action dated May 16, 2017 for EP Application No. 10740824.7.
Korean Office Action dated Jul. 27, 2017 for KR Application No. 10-2012-7005886.
Korean Office Action dated Dec. 14, 2017 for KR Application No. 10-2017-7029684.

* cited by examiner

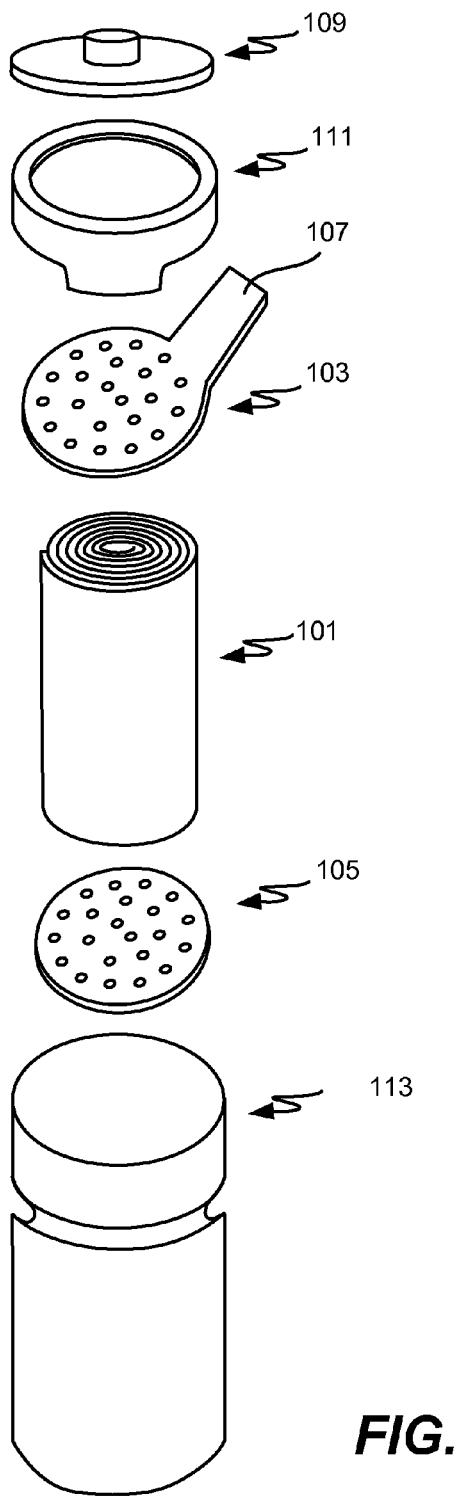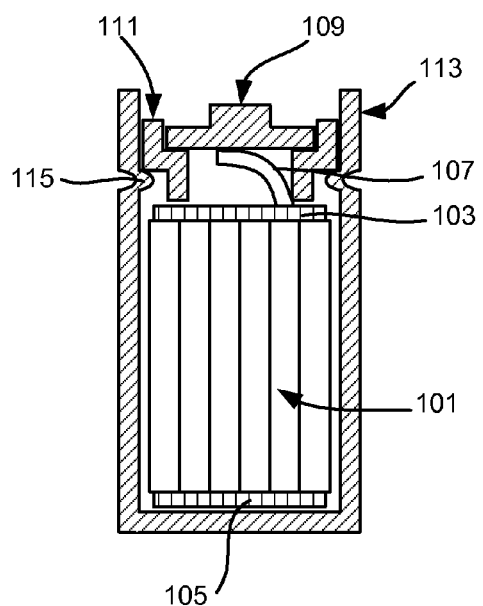
FIG. 1A
FIG. 1B

CARBON FIBER ZINC NEGATIVE ELECTRODE

CROSS-REFERENCE TO RELATED APPLICATIONS

This application claims the benefit of and priority to U.S. Provisional Application Ser. No. 61/232,271 filed Aug. 7, 2009, the contents of which are incorporated herein by reference in their entirety and for all purposes.

FIELD

This invention pertains generally to rechargeable batteries and specifically to rechargeable nickel-zinc batteries. More specifically, this invention pertains to the composition and manufacturing methods for zinc negative electrodes used in rechargeable nickel-zinc batteries.

BACKGROUND

The popularity of cordless portable devices, such as power tools, has increased the needs and requirements for high energy density rechargeable batteries that can also deliver high power. As power and energy density requirements increase, the need for a high cycle life rechargeable electrode also increases. The alkaline zinc electrode is known for its high voltage, low equivalent weight and low cost. The fast electrochemical kinetics associated with the charge and discharge process enables the zinc electrode to deliver both high power and high energy density, but with newer technology comes the need for higher power and higher energy density rechargeable batteries.

As demands for higher power and energy density escalate, the composition and associated manufacturing methods of nickel-zinc batteries become ever more critical to performance. Higher power/higher energy density batteries are needed, as well as methods of making such batteries, suitable for electric vehicles (EV), plug-in hybrid electric vehicles (PHEV), consumer electronics and other applications.

SUMMARY

The conductivity of zinc negative electrodes is enhanced through use of surfactant-coated conductive particles. In certain embodiments, the conductive particles are carbon particles which may be in the form of fibers. Carbon fibers, alone or along with other active materials such as bismuth oxide, zinc etc., form an electronically conductive matrix in zinc negative electrodes. Zinc negative electrodes as described herein are particularly useful in nickel zinc secondary batteries.

Thus, one aspect of the invention is a rechargeable nickel zinc cell including a zinc negative electrode having electrochemically active zinc and surfactant-coated carbon fiber; and a nickel positive electrode. In some embodiments, the electrochemically active zinc includes at least one of zinc and zinc oxide. In some embodiments, the electrochemically active zinc is in the form of particles having a size of less than about 40 microns and optionally coated with tin and/or lead. In some embodiments where lead is used to coat the zinc particles, the lead is present in less than about 0.05% by weight of the zinc negative electrode active material. In some embodiments the zinc negative electrodes include no more than about 3% by weight of the carbon fiber by dry weight of the negative electrode. In some embodiments, the nickel positive electrode of a nickel zinc cell as described herein includes cobalt and/or a cobalt compound, in some instances coated on (or otherwise incorporated in) nickel hydroxide particles.

When carbon fiber is used, the dimensions of the carbon fiber may be important. In some embodiments, the carbon fiber is between about 10 μm and 500 μm in length, and between about 1 μm and 50 μm in diameter. In some examples, the carbon fiber is between about 100 μm and 400 μm in length, and between about 2.5 μm and 40 μm in diameter, and in more specific examples between about 100 μm and 300 μm in length, and between about 5 μm and 20 μm in diameter. In some embodiments, the fiber has a ratio of length to width of between about 50:1 and about 10:1, and in specific examples between about 40:1 and about 10:1, and in more specific examples between about 30:1 and about 10:1.

In various embodiments, electroconductive particles used for negative electrodes as described herein are coated with a surfactant. If carbon particles are used, the carbon particles may be metallized as well. Thus another aspect of the invention is a zinc negative electrode including electrochemically active zinc; and carbon particles coated with a surfactant. In some embodiments the carbon particles are carbon fibers as described above. In particular embodiments, the carbon fibers are metallized with zinc and surfactant coated.

Another aspect of the invention is a method of fabricating a zinc negative electrode, the method including: (i) receiving electrochemically active zinc; (ii) receiving conductive particles coated with surfactant; (iii) forming a paste or slurry from the electrochemically active zinc, the coated conductive particles, and a liquid; and (iv) incorporating the paste or slurry into a zinc electrode. Other methods may be characterized by the following operations: (i) coating lead and/or tin onto zinc metal particles; (ii) coating carbon particles with a surfactant to make coated carbon particles; (iii) forming a paste from the coated zinc particles, the coated carbon particles, bismuth oxide, a dispersing agent, a binding agent, and a liquid; and (iv) coating the paste onto a zinc electrode substrate. In some embodiments the carbon particles are carbon fibers as described above. Some zinc negative electrodes made using these methods share the aspects of zinc negative electrodes described above, for example, carbon particle dimensions and the like. Pasted electrodes are typically used for wound and prismatic cells, while gelled electrodes are typically used for pencil cells.

Yet another aspect of the invention is a method of fabricating a zinc negative electrode, including: (i) treating carbon particles with a surfactant to produce surfactant-coated carbon fiber; (ii) combining the surfactant-coated carbon particles with, at least, electrochemically active zinc to produce an evenly dispersed mixture; and (iii) coating a substrate current collector with the evenly dispersed mixture. In some embodiments, the carbon particles are carbon fibers. Further aspects of this method may include heating the substrate current collector after (iii) to remove some organic components and allowing the substrate current collector to cool to about ambient temperature before integrating the zinc negative electrode into a battery. In some embodiments the battery is a nickel zinc battery, where the nickel positive electrode includes cobalt and/or a cobalt compound, in some instances coated on (or incorporated in) nickel hydroxide particles. Some aspects of this method include integrating the zinc negative electrode into a jellyroll configuration for use in nickel zinc secondary batteries.

One embodiment is a method of fabricating a gelled zinc negative electrode, including: (i) treating carbon particles with a surfactant to produce surfactant-coated carbon particles; (ii) combining the surfactant-coated carbon particles with, at least, electrochemically active zinc to produce an evenly dispersed mixture; and (iii) combining the evenly dispersed mixture with a gelling agent. Embodiments include carbon particles as described herein, including surfactant coated carbon particles, optionally metallized.

These and other features and advantages are further discussed below with reference to the associated drawings.

BRIEF DESCRIPTION OF THE DRAWINGS

FIGS. 1A, 1B and 1C are graphical representations of the main components of cylindrical nickel zinc power cells.

DETAILED DESCRIPTION

A. Definitions

Figure 1C:
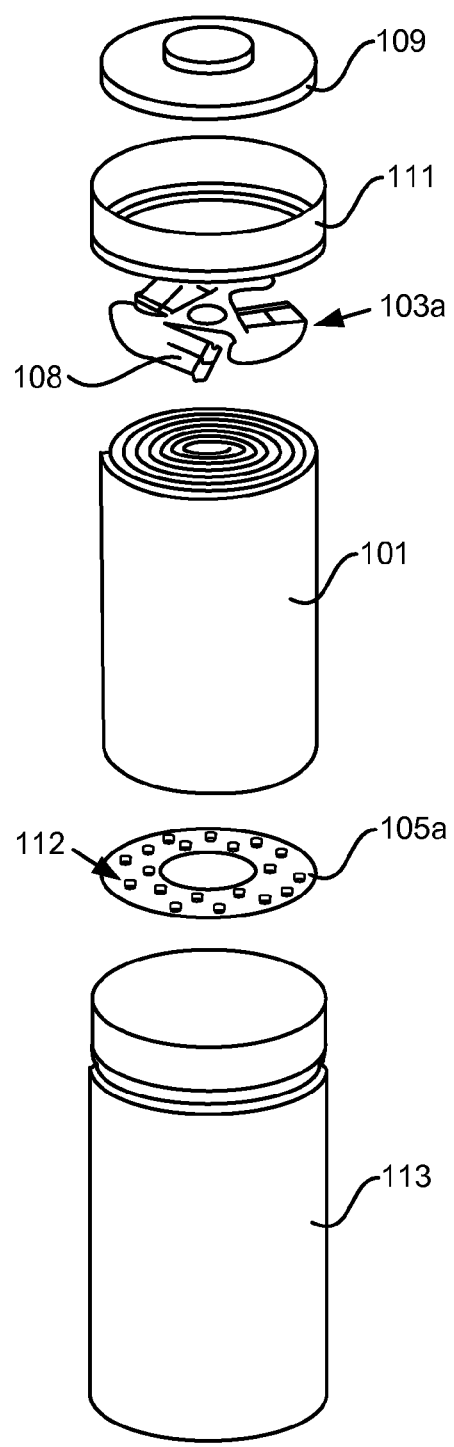

Some of the terms used herein are not commonly used in the art. Other terms may have multiple connotations in the art. Therefore, the following definitions are provided as an aid to understanding the description herein. The invention as set forth in the claims should not necessarily be limited by these definitions.

"Particle" as used herein, includes particles of various shapes including spheres, spheroids, irregular shapes and fibers.

"Fiber" refers to an elongated structure generally having a small diameter in proportion to length. A fiber is generally characterized by an aspect ratio (i.e., a ratio of length to width (or diameter)). In some cases, fibers have an aspect ratio of at least about 1.5 to 1 or at least about 2 to 1. Fibers can be present in combination with non-fiber components of the same material as the fibers. For example, a source of carbon fibers can contain both fibers and non-fiber particles. Typically, in order to be considered "fibers" a mixture of fibers and non-fiber particles should contain a majority of fibers in the mixture. A fiber can have a substantially regular, for example circular or rectangular, or irregular cross section and/or a smooth or rough irregular surface. A fiber can extend linearly, or substantially linearly, or crookedly. Examples of a fiber include a thread, a filament, a whisker and the like.

"Diameter" refers to average diameter, for example in substantially spherical particles, or for example in a fiber (in which case diameter is usually reserved for a transverse dimension orthogonal to an axial dimension), typically with an associated standard deviation from the stated diameter.

"Length" refers to the principal or axial dimension of a fiber. The term typically refers to an average length, typically with an associated standard deviation from the stated length.

"Surfactant-coated" means that the particle, fiber or other structure described has been exposed to a surfactant and at least some of the surfactant remains on the surface of the structure.

"Triton™" refers to a family of non-ionic surfactants which have hydrophilic polyethylene oxide groups and a hydrocarbon lipophilic or hydrophobic group (Triton surfactants are marketed by Rohm and Haas of Philadelphia, Pa.). Generally the term refers to the polyglycol family of non-ionic surfactants, i.e. those non-ionic surfactants containing for example polyethylene glycol, polypropylene glycol, polybutylene glycol and/or similar polyglycol subunits. For example, poloxamers (tribloc copolymers) are also members of the polyglycol family. "Igepal™" refers to a trade name for another surfactant, tert-octylphenoxy poly (oxyethylene)ethanol, of this family available from Sigma Aldrich of St. Louis Mo.

B. Overview

The conductivity of zinc negative electrodes is enhanced through use of surfactant-coated particles. In some embodiments the particles are carbon particles. Carbon, or other, particles may be in the form of fibers. Carbon fibers as described herein, along with other active materials such as bismuth oxide, zinc etc., form an electronically conductive matrix in zinc negative electrodes. Zinc negative electrodes as described herein are particularly useful in nickel zinc secondary batteries. The resulting rechargeable cells of the present invention possess one or more of the following characteristics: long shelf life, long cycle life, high midpoint voltage, low leakage, and little or no bulging. A long shelf life is defined as having greater than 10% capacity remaining after 1 month at 60° C. Leakage is generally characterized by chemicals exuding from the vent mechanism. Bulging of the can may be characterized by some distension of the base (or side) of the can signifying, for example, internal gas pressure build up.

Below is a brief discussion of nickel zinc battery chemistry as it relates to the invention, followed by more detailed discussion of battery design with focus on specific features of the present invention as they relate to nickel zinc batteries described.

Electrochemical Reactions of Nickel Zinc Batteries

The charging process for a nickel hydroxide positive electrode in an alkaline electrochemical cell is governed by the following reaction:

$$Ni(OH)_2 + OH^- \rightarrow NiOOH + H_2O + e^- \quad (1)$$

Alkaline electrolyte acts as ion carrier in the Zn electrode. In the rechargeable Zn electrode, the starting active material is the ZnO powder or a mixture of zinc and zinc oxide powder. The ZnO powder dissolves in the KOH solution, as in reaction (2), to form the zincate ($Zn(OH)_4^{2-}$) that is reduced to zinc metal during the charging process, as in reaction (3). The reaction at the Zn electrode can be written as follows:

$$ZnO + 2OH^- + H_2O \rightarrow Zn(OH)_4^{2-} \quad (2)$$

and $$Zn(OH)_4^{2-} + 2e^- \rightarrow Zn + 4OH^- \quad (3)$$

Therefore, net electrode at the negative is $$ZnO + H_2O + 2e^- \rightarrow Zn + 2OH^- + 2e^- \quad (4)$$

Then, the overall Ni/Zn battery reaction can be expressed as follows:

$$Zn + 2NiOOH + H_2O \rightarrow ZnO + 2Ni(OH)_2 \quad (5)$$

In the discharging process of the zinc electrode, the zinc metal donates electrons to form zincate. At the same time, the concentration of the zincate in the KOH solution increases.

Upon recharge, reactions (1)-(5) are repeated. During the life of a nickel zinc battery, these charge-discharge cycles are repeated a number of times. The invention addresses the efficiency of the zinc negative electrode, for example, battery cells employing the zinc electrodes containing conductive fibers as described herein provide excellent performance in multiple areas.

C. Embodiments

Conventional zinc negative electrodes include alumina, ceramic, cellulose, carbon or other particles, for example, fibers, in the active material to promote uniform current density by irrigating the negative electrodes, i.e. serving as wicking agents to promote flow and distribution of electrolyte. They may also be instrumental in the avoidance of dendrite formation and serve as structural elements to the electrode. Some fibers are also conductive.

The inventors have found that introduction of surfactant-coated particles into the negative electrode increases the overall current carrying capability of the electrode. Thus, one aspect of the invention is a negative electrode which includes surfactant-coated particles. Surfactant-coated fibers work exceptionally well due to their elongated structure and ability to form networks. The surfactant-coated particles, particularly fibers, may also serve other functions, for example as irrigating agents, as described above and/or be used in conjunction with other particles or fibers.

In certain disclosed embodiments, surfactant-coated carbon fibers are used to form an electronically conductive matrix along with other active materials such as bismuth oxide, zinc, etc. The inventors have also found that surfactant-coated carbon fiber containing electrodes have flatter and higher voltage discharge curves under high rate discharge than the control electrode containing alumina fiber. The inventors have also determined that surfactant-coated carbon fibers are distributed uniformly throughout the entire electrode during the pasting process. While not wishing to be bound to theory, it is believed that the surfactant-coated carbon fiber promotes uniform reaction on the electrode surface by increasing the electronic conductivity. It is also believed that surfactant-coated fibers enhance the hydrophilicity of the fibers relative to non-surfactant-coated particles and thus aid in irrigation of aqueous electrolyte in the negative electrode. It is also believed that the carbon fiber adds a structural element to negative electrodes employing such fibers, while decreasing weight as compared to ceramic, metal or other heavier particles or fibers.

Negative electrodes employing surfactant-coated particles are used, for example, in rechargeable nickel zinc cells. Thus, one aspect of the invention is a rechargeable nickel zinc cell including: i) a zinc negative electrode having electrochemically active zinc and surfactant-coated carbon fiber; and ii) a nickel positive electrode. These electrodes can be used in wound (jellyroll), prismatic and pencil cells. A more detailed description of nickel zinc batteries, including description of electrode and component embodiments, particularly the negative electrode and components, follows.

Nickel-Zinc Battery and Battery Components

FIGS. 1A and 1B are graphical representations of the main components of a cylindrical power cell according to one embodiment, with FIG. 1A showing an exploded view of the cell. Alternating electrode and electrolyte layers are provided in a cylindrical assembly 101 (also called a "jellyroll"). The cylindrical assembly or jellyroll 101 is positioned inside a can 113 or other containment vessel. A negative collector disk 103 (for example copper, optionally plated with for example tin) and a positive collector disk 105 (for example nickel, for example in the form of a foam) are attached to opposite ends of cylindrical assembly 101. The negative and positive collector disks function as internal terminals, with the negative collector disk electrically connected to the negative electrode and the positive collector disk electrically connected to the positive electrode. A cap 109 and the can 113 serve as external terminals. In the depicted embodiment, negative collector disk 103 includes a tab 107 for connecting the negative collector disk 103 to cap 109. Positive collector disk 105 is welded or otherwise electrically connected to can 113. In other embodiments, the negative collector disk connects to the can and the positive collector disk connects to the cap.

The negative and positive collector disks 103 and 105 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution. Negative collector disks are typically copper, optionally coated with tin, and positive collector disks typically are nickel or at least include nickel in their composition.

A flexible gasket 111 rests on a circumferential bead 115 provided along the perimeter in the upper portion of can 113, proximate to the cap 109. The gasket 111 serves to electrically isolate cap 109 from can 113. In certain embodiments, the bead 115 on which gasket 111 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment typically by a crimping process using the portion of the can above bead 115 and crimping that annular portion of can 113 inward and over the top portion of gasket 111. In certain embodiments, a sealing agent is used to prevent leakage. Examples of suitable sealing agents include bituminous sealing agents, tar and VERSAMID™ available from Cognis of Cincinnati, Ohio.

FIG. 1C depicts a more specific configuration of a jelly roll nickel zinc cell as described herein. This cell is similar to that in FIGS. 1A and 1B, having a jellyroll electrode assembly 101, a can 113, a cap 109, a flexible gasket 111, etc., but in this example, the negative collector disk, 103a, is slotted and there are vertical (decending) tabs, or energy directors, 108 for forming electrical connection to the wound negative current collector at the top of jellyroll 101. When this cell is assembled tabs 108 are pressed against the negative current collector and the topmost portion of negative current collector disk 103a presses against cap 109 to complete the electrical connection between the negative current collector and cap 109. In one embodiment, tabs 108 are configured so as not to rip or tear into the negative current collector (as depicted, tabs 108 have curved portions, for example in this depiction like skis, which rest on the negative current collector). In one embodiment, tabs 108 are configured to bite into the negative current collector, for example, not having skis. In another embodiment, tabs 108 can have curved portions and protrusions meant to bite into the negative current collector. Negative current collector disk 103a, also has a center hole for introducing electrolyte to the jellyroll. The positive current collector disk can also be configured as disk 103a, where the center hole is used to facilitate electrolyte flow, for example where an electrolyte reservoir is maintained at the lower portion of the cell, between the bottom of jellyroll and the bottom of the can. In this embodiment however, positive current collector disk 105a is perforated as described for disk 105 in FIG. 1A, except that disk 105a also includes protrusions 112 which make electrical contact with the wound positive current collector at the bottom of the jellyroll 101. In one embodiment, the wound positive current collector is folded over against the bottom of jellyroll 101 and protrusions 112 pierce the folded positive current collector to establish electrical contact.

In certain embodiments, the cell is configured to operate in an electrolyte "starved" condition. Further, in certain embodiments, nickel-zinc cells of this invention employ a starved electrolyte format. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116,113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The battery cells of this invention can have any of a number of different shapes and sizes. For example, cylindrical cells of this invention may have the diameter and length of conventional AAA cells, AA cells, D cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, for example, a power tool or lawn tool will dictate the size and shape of the battery cells. This invention also pertains to battery packs including one or more nickel-zinc battery cells of this invention and appropriate casing, contacts, and conductive lines to permit charge and discharge in an electric device.

Note that the embodiments shown in FIGS. 1A, 1B and 1C have a polarity reverse of that in conventional cells, in that the cap is negative and the can is positive. In conventional power cells, the polarity of the cell is such that the cap is positive and the can or vessel is negative. That is, the positive electrode of the cell assembly is electrically connected with the cap and the negative electrode of the cell assembly is electrically connected with the can that retains the cell assembly. In a certain embodiments of this invention, including that depicted in FIGS. 1A, 1B and 1C, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap.

Figure 2:
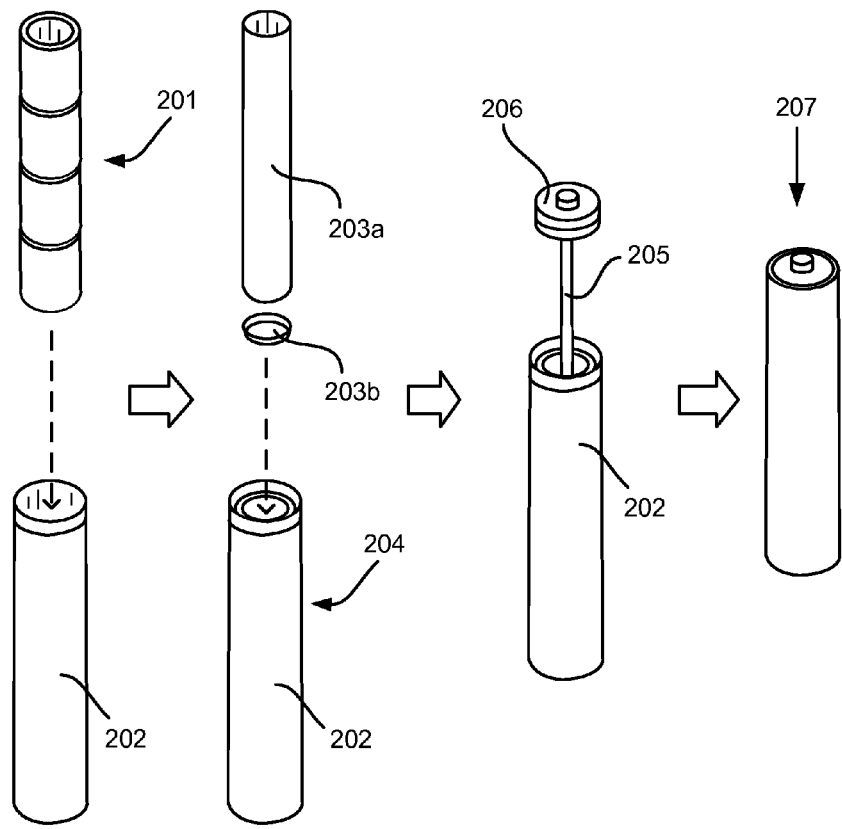
FIG. 2 depicts one method of manufacturing nickel zinc pencil batteries.

While FIGS. 1A, 1B and 1C depict jellyroll designs, the invention is not so limited. In one embodiment, batteries as described herein also include pencil cell configurations. FIG. 2 depicts one method of manufacturing pencil batteries such as those described herein. Referring to FIG. 2, a positive electrode material (active material and added components) is formed into small cylindrical and hollow pellets, for example in a stack, 201, of pellets. In this example, four pellets are introduced into a can 202. A separator tube, in this example made of tube 203a and bottom cap 203b fused together to form a tube, is placed inside the anode cavity (inside the annular anode stack, which is inside can 202) thus formed, as indicated by the dashed arrow. Separators as described herein may also be extruded or molded as a single piece, rather than assembled from two pieces as depicted here. The assembly of pellets 201, 202 and the separator is depicted as assembly 204. A gelled negative electrode material containing surfactant-coated particles as described herein is then introduced in the separator tube. In one embodiment, the surfactant-coated particles are surfactant-coated carbon fibers. The gelled negative electrode material can be preformed and introduced to the separator tube, or the components of the gelled negative electrode material can be mixed in situ in the separator. In some embodiments, the topmost portion of the separator is above the topmost portion of the hollow cylindrical positive electrode, which in turn is above the topmost portion of the gelled negative electrode. In other embodiments, the topmost portion of the separator is between about 2 mm and about 5 mm (for example, about 3 mm) above the topmost portion of the hollow cylindrical positive electrode, which in turn is between about 0.5 mm and about 2 mm (for example, about 1 mm) above the topmost portion of the gelled negative electrode. This arrangement helps prevent zinc from creeping over the separator and reaching the positive electrode.

In alternative methods, rather than a stack of pelleted anode material, the positive material is introduced into the can and then pressed into a hollow cylindrical shape prior to, or concurrent with, introduction of the separator. This can be accomplished, for example, by inserting a dummy rod into the can, compressing the positive electrode material around the rod and then removing the rod. In one example, the dummy rod has the separator on it during compression of the anode material so that once the rod is removed, assembly 204 is achieved efficiently.

Referring again to FIG. 2, a current collector, 205, for example a brass, stainless steel, or tin coated brass structure, is introduced into the gelled negative electrode. Aspects of the current collector will be described in more detail in a separate section below. In some cases, the current collector 205, for example a "nail", is welded to a closure 206, which when used to seal the battery, places the nail in the center of the gelled negative electrode. Once sealed, the assembly of battery 207 is complete. Following assembly, formation, charge, discharge and recharge can take place.

Rechargeable Ni—Zn "pencil" batteries described herein have a cylindrical geometry where the battery length is greater than its diameter; that is, the ratio of the length of the battery to the diameter of the battery is at least about 1.5:1, and in certain embodiments between about 1.5:1 and about 20:1. In more specific embodiments, the ratio of the length of the battery to the diameter of the battery is between about 1.5:1 and 10:1. In other embodiments, the ratio of the length of the battery to the diameter of the battery is between about 1.5:1 and 5:1. In some implementations, the diameter of batteries as described herein is between about 5 mm and about 100 mm. In some embodiments, the ratio of the length of the battery to the diameter of the battery is greater than about 5.5:1 and the diameter is between about 10 mm and 50 mm. In some embodiments, batteries as described herein are configured to commercially available sizes, for example AAAA, AAA, AA, C, D, sub-C and the like. In other embodiments, batteries as described herein may have diameters substantially the same as conventional commercially available batteries but are longer.

In certain embodiments, the rechargeable pencil batteries described herein are capable of between about 50 and 1000 cycles from a fully charged state to a fully discharged state at a discharge rates of about 1 C or greater, or between about capable of between about 100 and 800 cycles from a fully charged state to a fully discharged state at a discharge rates of about 1 C or greater, or between about capable of between about 200 and 500 cycles from a fully charged state to a fully discharged state at a discharge rates of about 1 C or greater. In some embodiments, these cycle ranges are achieved by batteries as described herein from a fully charged state to a fully discharged state at a discharge rates of about 0.5 C or greater.

Battery Can

The battery can is the vessel serving as the outer housing or casing of the final cell. In conventional cells, where the can is the negative terminal, it is typically nickel-plated steel. As indicated, in this invention the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion. In embodiments where the can is positive and the cap negative, the can may be a composition similar to that used in convention nickel—cadmium cells, typically nickel-plated steel.

In some embodiments, the interior of the positive polarity can may be coated with a material to aid hydrogen recombination. Any material that catalyzes hydrogen recombination may be used. An example of such a material is silver oxide.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell is designed to operate at this pressure and even higher (for example, up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Some details of the structure of a vent cap and disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Electrodes and Separator Structure

Figure 3:
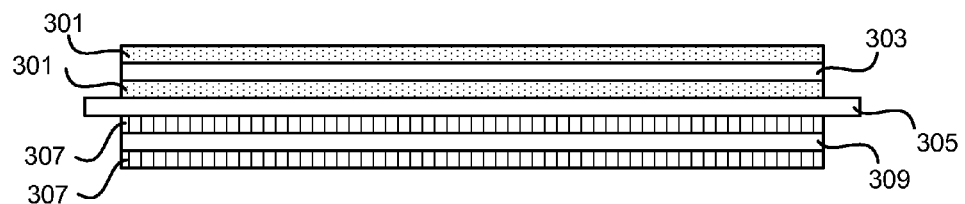
FIG. 3 illustrates layers in the negative electrode-separator-positive electrode sandwich structure for a jellyroll or prismatic cell structure.

FIG. 3 illustrates layers in the negative electrode-separator-positive electrode sandwich structure which may be used in a jellyroll or prismatic cell structure. The separator 305 mechanically and electrically separates the negative electrode (components 301 and 303) from the positive electrode (components 307 and 309) while allowing ionic current to flow between the electrodes. The negative electrode includes electrochemically active layers 301 and an electrode substrate 303. The electrochemically active layers 301 of the zinc negative electrode typically include zinc oxide and/or zinc metal as the electrochemically active material as well as surfactant-coated particles as described herein. The layer 301 may also include other additives or electrochemically active compounds such as calcium zincate, bismuth oxide, aluminum oxide, indium oxide, hydroxyethyl cellulose, and a dispersant. The composition of zinc negative electrodes in accordance with certain embodiments will be described in more detail below.

The negative electrode substrate 303 should be electrochemically compatible with the negative electrode materials 301. As described above, the electrode substrate may have the structure of a perforated metal sheet, an expanded metal, a metal foam, or a patterned continuous metal sheet. In some embodiments, the substrate is simply a metal layer such as a metal foil.

Opposite from the negative electrode on the other side of the separator 305 is the positive electrode. The positive electrode also includes electrochemically active layers 307 and an electrode substrate 309. The layers 307 of the positive electrode may include nickel hydroxide, nickel oxide, and/or nickel oxyhydroxide as electrochemically active materials and various additives, all of which are described herein. The electrode substrate 309 may be, for example, a nickel metal foam matrix or nickel metal sheets. Note that if a nickel foam matrix is used, then layers 307 would form one continuous electrode because they fill the voids in the metal foam. The layered zinc negative electrode and nickel positive electrode structure is wound into a jellyroll as depicted in FIGS. 1A and 1B, structure 101, or used in a prismatic cell without such winding.

As discussed above, in pencil cell configurations a gelled negative is typically, but not necessarily, used, rather than a paste material. One embodiment includes a pencil cell where a negative active material paste as described herein is used in the negative electrode of the pencil cell.

More detailed features of the positive electrode, separator, electrolyte and negative electrodes, for jellyroll and pencil cell configurations follow.

The Positive Electrode

The nickel hydroxide electrode has been used as the positive electrode in high power and high energy nickel-metal hydride batteries, nickel-cadmium batteries and nickel-zinc batteries. The nickel positive electrode generally includes electrochemically active nickel oxide or hydroxide or oxyhydroxide and one or more additives to facilitate manufacturing, electron transport, wetting, mechanical properties, etc. For example, a positive electrode formulation may include nickel hydroxide particles, zinc oxide, cobalt oxide (CoO), cobalt metal, nickel metal, and a thixotropic agent such as carboxymethyl cellulose (CMC). Note that the metallic nickel and cobalt may be provided as chemically pure metals or alloys thereof. The positive electrode may be made from paste containing these materials and a binder such as a polymeric fluorocarbon (for example, Teflon™).

In certain embodiments, the nickel hydroxide electrode includes nickel hydroxide (and/or nickel oxyhydroxide), cobalt/cobalt compound powder, nickel powder and binding materials. The cobalt compound is included to increase the conductivity of the nickel electrode. In one embodiment, the nickel positive electrode includes at least one of cobalt oxide, cobalt hydroxide, and/or cobalt oxyhydroxide; optionally coated on nickel hydroxide (or oxyhydroxide) particles.

A nickel foam matrix may be used to support the electro-active nickel oxide (for example, $Ni(OH)_2$) electrode material. The foam substrate thickness may be may be between 15 and 60 mils. The thickness of the positive electrode, which includes nickel foam filled with the electrochemically active and other electrode materials, ranges from about 16-24 mils, preferably about 20 mils thick. In one embodiment, a nickel foam density of about 350 $g/m^2$ and thickness ranging from about 16-18 mils is used.

In certain embodiments, the batteries include a non-nickel positive electrode (for example, a silver or air electrode). The silver-zinc system employs silver-oxide as the positive electrode, while the zinc-air system employs a gas-diffusion electrode containing catalysis for oxygen reduction-production.

With regard to pencil cell configurations, the positive electrode material includes an electrochemically active nickel hydroxide of the type described herein. In addition, the electrode may contain small amounts of an "irrigative" agent such as carboxymethylcellulose (CMC), alumina, cellulose, alumina/silica composites and nylon fibers. In one embodiment, newsprint is used as the irrigative agent. Irrigative agents, when present, are at a concentration of between about 1% and about 6%, and in some embodiments between about 2% and about 3% by weight percent. The irrigative agent helps keep the positive electrode sufficiently wet during cycling. Since the thickness of the electrode may hinder transport of electrolyte to the interior regions of the electrode during repeated cycling, an irrigative agent may be necessary, in sufficient amounts, to ensure good long-term performance. The positive electrode also optionally includes a binder such as Teflon® (generally a fluorinated polyolefin such as PTFE) at a concentration of about 0.1-2 percent by weight.

Still further, the positive electrode may contain a highly conductive additive such as nickel metal, carbon, conductive ceramics, cobalt metallic powder or Cobalt compounds, and conductive polymers. The conductive additive(s) are added in amounts of between about 2% and 8% by volume of the total positive electrode material. The final concentration of conductive additives in the positive electrode is at least about 10% percent by volume. In some embodiments the final concentration of the conductive additives is about 20% percent by volume. The conductive material can be in the form of a powder, foam, fiber or combinations thereof. The conductive additive may be necessary to maintain good performance, particularly high rate performance, of the relatively thick electrodes (as compared to for example a Jellyroll configuration) described herein.

The balance of the positive electrode material will be nickel hydroxide (or a modified nickel compound). In certain embodiments, the nickel hydroxide is present in an amount of about 60-95 weight percent. Note that all concentrations and amounts of positive electrode components recited here are based on the dry weight the positive electrode, which does not include electrolyte that infuses the electrode during assembly and operation.

In a specific example, the pasted nickel hydroxide electrode composition is made from about 1 to about 5 weight % Co powder, about 2 to about 10 weight % Ni210 powder together with about 0.4 to about 2 weight % sodium carboxymethyl cellulose (CMC), and about 0.1 to about 2 weight % poly(tetrafluoroethylene) (PTFE). Nickel hydroxide powder makes up the balance.

The component materials of nickel hydroxide, nickel and cobalt powders are dry blended together with a suitable binder and are introduced into a hopper. In one embodiment, the dry mixture is used to form the anode pellets as described above used to manufacture certain batteries as described herein. In another embodiment, a continuous strip of foam nickel is drawn through the powder while rotating brushes force the dry material into the foam pores. A compression step can then, for example, press the foam into annular pellets as described above.

The positive electrode as described herein has a hollow substantially cylindrical shape. As mentioned, the positive electrode can be a one-piece construction, but in some embodiments the positive electrode is constructed by stacking rings of the positive electrode material (which contains active material and other agents as described herein). As described in the experimental example below, many thin rings can be used in the stack to achieve the desired electrode height or in some examples, as depicted in FIG. 1, a few taller rings can be used to form the stack.

An important consideration is the width of the rings used to make the positive electrode stack because, once stacked, they form the hollow occupied by the negative electrode. The hollow defines the surface area with which the negative electrode makes electrical contact (via the separator) and, including the separator (although relatively thin, compared to the anode), determines the volume and thus the maximum amount of negative electrode that can be used in the cell. Various formulations as described herein for both the positive and negative electrode, and their resultant electrical conductivity, require particular positive ring thickness to achieve a desired balance of the negative to positive electrical communication surface area which determines the mAH available per square centimeter of interface area. The positive thickness can be expressed in terms of a relative ratio of the diameter of the hollow to the diameter of the cell. In one embodiment, the relative ratio of the diameter of the hollow to the diameter of the cell is between about 0.4 and about 0.95. In another embodiment, the relative ratio of the diameter of the hollow to the diameter of the cell is between about 0.5 and about 0.9. In yet another embodiment, the relative ratio of the diameter of the hollow to the diameter of the cell is between about 0.6 and about 0.85. In some embodiments, cells as described herein have a diameter of between about 5 mm and 100 mm. Thus in one example, for high cycle life and higher rate at high energy density, an AA cell (diameter for example 14 mm) will have a cylindrical positive between about 1 mm and about 3 mm thick, in another example an AA cell with have a cylindrical positive between about 1.5 mm and 2.5 mm thick, in yet another example an AA cell with have a cylindrical positive between about 2.1 mm and 2.5 mm thick (relative ratio of the diameter of the hollow to the diameter of the cell is between about 0.6 and about 0.7). In cells with larger diameters, for example D or non-traditional sizes, the anode can be thicker due to the higher interfacial area but one must factor in a power-energy trade off.

The Separator

Typically, a separator will have small pores. In certain embodiments the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a certain embodiments, the separator includes at least two layers (and preferably exactly two layers)—a barrier layer to block zinc penetration and a wetting layer to keep the cell wet with electrolyte, allowing ionic current to flow. This is generally not the case with nickel cadmium cells, which employ only a single separator material between adjacent electrode layers.

Performance of the cell may be aided by keeping the positive electrode wet and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. The barrier layer is typically about 0.5-4 mils thick, more preferably between about 1.5 and 4 mils thick.

The wetting layer may be made of any suitable wettable separator material. Typically the wetting layer has a relatively high porosity for example, between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (for example, polyethylenes and polypropylenes) are very often suitable. In pencil cells as described herein, substantially tubular separators, for example as described in relation to FIG. 2, are used.

Another consideration in the electrode/separator design is whether to provide the separator as simple sheets of approximately the same width as the electrode and current collector sheet or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

The separator is incorporated into cells as described herein as described herein, for example, with reference to FIGS. 2 and 3 for jellyroll and pencil cell configured batteries as described herein.

The Electrolyte

In certain embodiments pertaining to nickel-zinc cells, the electrolyte composition limits dendrite formation and other forms of material redistribution in the zinc electrode. Examples of suitable electrolytes are described in U.S. Pat. No. 5,215,836 issued to M. Eisenberg on Jun. 1, 1993, which is hereby incorporated by reference. In some cases, the electrolyte includes (1) an alkali or earth alkali hydroxide, (2) a soluble alkali or earth alkali fluoride, and (3) a borate, arsenate, and/or phosphate salt (for example, potassium borate, potassium metaborate, sodium borate, sodium metaborate, and/or a sodium or potassium phosphate). In one specific embodiment, the electrolyte includes about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications includes about 8.5 equiv/liter of hydroxide, about 4.5 equivalents of boric acid and about 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (for example, KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may include a liquid and a gel. The gel electrolyte may include a thickening agent such as CARBOPOL® available from Noveon of Cleveland, Ohio. In a preferred embodiment, a fraction of the active electrolyte material is in gel form. In a specific embodiment, about 5-25% by weight of the electrolyte is provided as gel and the gel component includes about 1-2% by weight CARBOPOL®.

In some cases, the electrolyte may contain a relatively high concentration of phosphate ion as discussed in U.S. Pat. No. 7,550,230, entitled "Electrolyte Composition for Nickel Zinc Batteries," filed Feb. 1, 2006, by J. Phillips and S. Mohanta, which is incorporated herein by reference for all purposes.

The Negative Electrode

As applied to nickel-zinc cells, the negative electrode includes one or more electroactive sources of zinc or zincate ions optionally in combination with one or more additional materials such as surfactant-coated particles as described herein, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may include one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, for example, calcium oxide and zinc oxide.

Active material for a negative electrode of a rechargeable zinc alkaline electrochemical cell may include zinc metal (or zinc alloy) particles. If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada. In one embodiment, the electrochemically active zinc metal component of nickel zinc cells as described herein contains less than about 0.05% by weight of lead. Tin may also be used in the zinc negative electrode.

In certain embodiments, the zinc metal particles may be coated with tin and/or lead. The zinc particles may be coated by adding lead and tin salts to a mixture containing zinc particles, a thickening agent and water. The zinc metal can be coated while in the presence of zinc oxide and other constituents of the electrode. A zinc electrode containing lead or tin coated zinc particles is generally less prone to gassing when cobalt is present in the electrolyte. The cycle life and shelf life of the cells is also enhanced, as the zinc conductive matrix remains intact and shelf discharge is reduced. Exemplary active material compositions suitable for negative electrodes of this invention are further described in U.S. patent application, Ser. No. 12/467,993, entitled "Pasted Zinc Electrode for Rechargeable Nickel-Zinc Batteries," by J. Phillips et. al., filed May 18, 2009, which is hereby incorporated by reference for all purposes.

The zinc active material may exist in the form of a powder, a granular composition, fibers, etc. Preferably, each of the components employed in a zinc electrode paste formulation has a relatively small particle size. This is to reduce the likelihood that a particle may penetrate or otherwise damage the separator between the positive and negative electrodes.

Considering the electrochemically active zinc components in particular (and other particulate electrode components as well), such components preferably have a particle size that is no greater than about 40 or 50 micrometers. In one embodiment the particle size is less than about 40 microns, i.e. the average diameter is less than about 40 microns. This size regime includes lead coated zinc or zinc oxide particles. In certain embodiments, the material may be characterized as having no more than about 1% of its particles with a principal dimension (for example, diameter or major axis) of greater than about 50 micrometers. Such compositions can be produced by, for example, sieving or otherwise treating the zinc particles to remove larger particles. Note that the particle size regimes recited here apply to zinc oxides and zinc alloys as well as zinc metal powders.

In addition to the electrochemically active zinc component(s), the negative electrode may include one or more additional materials that facilitate or otherwise impact certain processes within the electrode such as ion transport, electron transport (for example, enhance conductivity), wetting, porosity, structural integrity (for example, binding), gassing, active material solubility, barrier properties (for example, reducing the amount of zinc leaving the electrode), corrosion inhibition etc.

Various organic materials may be added to the negative electrode for the purpose of binding, dispersion, and/or as surrogates for separators. Examples include hydroxyethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc.

In certain embodiments, polymeric materials such as PSS and PVA may be mixed with the paste formation (as opposed to coating) for the purpose of burying sharp or large particles in the electrode that might otherwise pose a danger to the separator.

When defining an electrode composition herein, it is generally understood as being applicable to the composition as produced at the time of fabrication (for example, the composition of a paste, slurry, or dry fabrication formulation), as well as compositions that might result during or after formation cycling or during or after one or more charge-discharge cycles while the cell is in use such as while powering a portable tool.

Various negative electrode compositions within the scope of this invention are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals.

Finally, it should be noted that while a number of materials may be added to the negative electrode to impart particular properties, some of those materials or properties may be introduced via battery components other than the negative electrode. For example, certain materials for reducing the solubility of zinc in the electrolyte may be provided in the electrolyte or separator (with or without also being provided to the negative electrode). Examples of such materials include phosphate, fluoride, borate, zincate, silicate, stearate. Other electrode additives identified above that might be provided in the electrolyte and/or separator include surfactants, ions of indium, bismuth, lead, tin, calcium, etc.

For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps may be taken to preserve battery components, including the negative electrode, in their chemically useful form. When electrode materials corrode or otherwise degrade to a significant extent over weeks or months without use, their value becomes limited by short shelf life.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Pencil cell configurations may contain a gelled negative electrode including one or more electroactive sources of zinc or zincate ions optionally in combination with one or more additional materials such as conductivity enhancing materials, corrosion inhibitors, wetting (or irrigating) agents, and gelling agents, etc. as described herein. When the electrode is fabricated it will be characterized by certain physical, chemical, and morphological features such as coulombic capacity, chemical composition of the active zinc, porosity, tortuosity, etc.

In one embodiment, the gelled negative electrode includes a solid mixture combined with a gelling agent and an alkali electrolyte. The solid mixture includes zinc and/or zinc oxide. In one implementation, the solid mixture includes between 0% and about 30% by weight of zinc, and between about 65% and 100% by weight of zinc oxide. The solid mixture, beside the electrochemically active zinc components, may also contain smaller amounts of, for example, irrigative agents, binders, and the like as described herein. The solid mixture is combined with an electrolyte and a gelling agent to form the gelled negative electrode. All "by weight" concentrations of negative electrode components recited herein are provided on the basis of dry components, without added electrolyte.

In addition to the electrochemically active zinc component(s), the gelled negative electrode may include one or more additional materials that facilitate or otherwise impact certain processes within the electrode such as ion transport, electron transport (for example, enhance conductivity), wetting, porosity, structural integrity (for example, binding), gassing, active material solubility, barrier properties (for example, reducing the amount of zinc leaving the electrode), corrosion inhibition etc.

The conductive agent can constitute up to about 35% of the volume of the gelled negative electrode (in a specific embodiment between about 5 and 30% of the volume. Examples of materials that may be added to the negative electrode to improve electronic conductance include various electrode compatible materials having high intrinsic electronic conductivity. The exact concentration will depend, of course, on the properties of chosen additive. Conductive agents for the gelled negative electrode include carbon (surfactant coated or not), titanium nitride, conductive ceramics such as titanium sub-oxides, bismuth, tin powders or oxides of bismuth and tin (that will convert to the metal during formation). The conductive material can be in the form of a powder, foam, fiber or combinations thereof. In some embodiments, copper foam, optionally coated with tin or zinc, is used as a conductive matrix. Relatively high concentrations of the conductive additive may be necessary to maintain good performance, particularly high rate performance, of the relatively thick negative electrodes described herein.

Gelling agents for the gelled negative electrode as described herein include carboxymethylcellulose, crosslinking-type branched polyacrylic acid, natural gum, CARBOPOL®. Note that while the negative electrode is described herein as a "gelled" electrode, the invention is not so limited. The negative electrode for a pencil cell may alternatively be provided as a slurry, a paste, a solid mixture, and the like.

One embodiment is a method of fabricating a gelled zinc negative electrode, including: (i) treating carbon particles with a surfactant to produce surfactant-coated carbon particles; (ii) combining the surfactant-coated carbon particles with, at least, electrochemically active zinc to produce an evenly dispersed mixture; and (iii) combining the evenly dispersed mixture with a gelling agent. Embodiments include carbon particles as described herein, including surfactant coated carbon particles.

As mentioned, conductive fibers added to the negative electrode may also serve the purpose of irrigating or wetting the electrode. Surfactant coated carbon fibers are one example of such material. However, it should be understood that other materials may be included to facilitate wetting. Examples of such materials include titanium oxides, alumina, silica, alumina and silica together, etc. Generally, when present, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Zinc negative electrodes as described herein contain materials that establish conductive communication between the electrochemically active component of the zinc negative electrode and the nickel positive electrode. As mentioned, the inventors have found that introduction of surfactant-coated particles into the negative electrode increases the overall current carrying capability of the electrode. Thus, one aspect of the invention is a negative electrode which includes surfactant-coated particles. Materials for conductive particles, particularly fibers, include carbon, ceramics, metals, metal oxides, and combinations thereof. Such combinations, for example, include but are not limited to, carbon fibers, metallized carbon fibers, tin, and lead (particularly tin and lead coated zinc fibers). One aspect of the invention is a zinc negative electrode including electrochemically active zinc and carbon particles coated with a surfactant. In a specific embodiment, the carbon particles are carbon fibers. In another embodiment, the carbon fibers are metallized as described above.

Surfactant-coated fibers work exceptionally well due to their elongated structure and ability to form networks. The surfactant-coated particles, particularly fibers, as described herein may also serve other functions, for example as irrigating agents, as described above and/or be used in conjunction with other particles or fibers. In some described embodiments, the surfactant-coated fibers are carbon fibers.

Surfactant-coated carbon fiber helps ensure uniform distribution in the negative electrodes to form a very good conductive matrix along with other active materials like bismuth oxide, zinc etc. This results in a better high rate discharge such as about 10 C or greater, for example, at about 11 C or 17 C rates or greater.

As indicated, when carbon fiber is used, the dimensions of the carbon fiber may be carefully controlled. The length should be chosen so as not to increase instances of separator piercing. In the case of a jellyroll configuration, for example, usually 2 mm will be too long, particularly when coupled to a wide diameter such as 400 microns. In some embodiments, the carbon fiber is between about 10 μm and 500 μm in length, and between about 1 μm and 50 μm in diameter, with a ratio of length to width of between about 50:1 and about 10:1. In other embodiments, the carbon fiber is between about 100 μm and 400 μm in length, and between about 2.5 μm and 40 μm in diameter, with a ratio of length to width of between about 40:1 and about 10:1. In yet other embodiments, the carbon fiber is between about 100 μm and 300 μm in length, and between about 5 μm and 20 μm in diameter, with a ratio of length to width of between about 30:1 and about 10:1. The small size of the carbon fiber enables it to distribute uniformly in the electrode to further enhance the conductivity. In some embodiments the fibers are provided in a form that requires no sieving, filtering or other size adjustment processing prior to coating or addition to the electrode mixture.

Carbon fibers used in electrodes described herein are generally thin fibers composed mostly of carbon atoms. The carbon atoms may be bonded together in microscopic crystals that are more or less aligned parallel to the long axis of the fiber. The crystal alignment makes the fiber very strong for its size. The properties of carbon fiber such as high tensile strength, low weight, and low thermal expansion make it very useful for electrodes as described herein not only for their improved conductivity, wicking, etc. as described, but also for their ability to impart lighter weight and structural integrity to the zinc negative electrode. In one embodiment, the zinc negative electrodes as described herein have less than 3% by weight of the carbon fiber by dry weight of the negative electrode, in other embodiments, less than 2% by weight of the carbon fiber by dry weight of the negative electrode.

Carbon fibers suitable for the invention may be made in a number of ways recognized by one of ordinary skill in the art. For example, carbon fibers can be made from long, thin filaments of carbon sometimes transformed to graphite. A common method of making carbon filaments is the oxidation and thermal pyrolysis of polyacrylonitrile (PAN). A common method of manufacture involves heating the PAN to approximately 300° C. in air, which breaks many of the hydrogen bonds and oxidizes the material. The oxidized PAN is then placed into a furnace having an inert atmosphere of a gas such as argon, and heated to approximately 2000° C., which induces graphitization of the material, changing the molecular bond structure. When heated, these chains bond side-to-side (i.e. ladder polymers), forming narrow graphene sheets which eventually merge to form a single round filament, of typically 93-95% carbon content. Carbon fiber can also be manufactured using other carbonaceous precursors such as pitch or rayon instead of PAN. The carbon can become further enhanced, for example to improve modulus, strength or conductivity, by heat treatment processes. Carbon heated in the range of 1500° C. to 2000° C. (carbonization) exhibits very high tensile strength (820,000 psi or 5,650 MPa or 5,650 N/mm$^2$), while carbon fiber heated from 2500° C. to 3000° C. (graphitizing) exhibits a higher modulus of elasticity (77,000,000 psi or 531 GPa or 531 kN/mm$^2$). Although the relative amounts of sp2 and sp3 can vary the conductivity of carbon fiber, conductivity is an important aspect of the benefits described here. Depending upon the morphology of graphitic carbon, higher graphitic nature may impart higher conductivity to the fiber.

As mentioned, the particles used in the zinc negative electrodes as described herein are generally surfactant-coated. A surfactant is a wetting agents that lowers the surface tension of a liquid, allowing easier spreading, and lower the interfacial tension between two materials, for example at gas-liquid, liquid-liquid and solid-liquid interfaces. Surfactants as described herein may be ionic or non-ionic. In one embodiment the surfactant is a non-ionic member of the polyglycol family of polymers. In a specific embodiment, the surfactant is a Triton. In a more specific embodiment, the surfactant is Triton X-100. Triton X-100 ($C_{14}H_{22}O(C_2H_4O)$) is a nonionic surfactant which has a hydrophilic polyethylene oxide group (on average 9.5 ethylene oxide units) and a hydrocarbon lipophilic 4-(1,1,3,3-tetramethylbutyl)-phenyl group. One of ordinary skill in the art would recognize that other surfactants, including other Tritons, would be suitable to make surfactant-coated fibers as described herein. Surfactants suitable for the invention include at least one of a Triton, a poloxamer and a fluorosurfactant (for example Zonyl™ trade name for a line of fluorosurfactants available from Dupont Corporaton of Wilmington Del.).

Surfactants may impart multiple benefits to zinc negative electrodes as described herein including: (1) better mixing during electrode fabrication (untreated carbon has been observed to float on the liquid medium used to fabricate the electrodes), (2) better irrigation because the surfactant imparts hydrophilicity to the carbon surface, (3) improved resistance to zinc deposition on the carbon (thereby allowing the carbon to continue functioning as a conductivity enhancing agent and irrigation agent), and (4) reduced generation of hydrogen gas during normal operation of the zinc electrode.

As mentioned above, some heat treated carbon fibers and/or those prepared in a manner so as to produce high surface energy, for example those having a more hydrophilic surface due to higher oxygen content via pyrolytic methods, may exhibit better conductivity (and wicking action). Carbon fibers having a surfactant coating have improved wicking properties. As mentioned, while not wishing to be bound to theory, it is believed that the surfactant-coated carbon fiber promotes uniform reaction on the electrode surface by increasing the electronic conductivity. It is also believed that the surfactant coating acts to maintain any improved conductivity etc. that may be imparted by heat treatment of carbon fibers. Thus one aspect of the invention is a surfactant-coated carbon fiber, where the carbon fiber was previously heat treated to between about 2000° C. and about 3000° C. Surfactant coating enhances the hydrophilicity of fibers to help maintain conductivity via enhanced electrolyte movement and inhibiting dissolution and deposition of active zinc onto the carbon fibers. Another aspect of the invention is a method of manufacture of surfactant-coated carbon fibers, including i) heat treating carbon fibers to between about 2000° C. and about 3000° C.; and, ii) exposing the heat treated carbon fibers to a surfactant. In one embodiment the surfactant is a non-ionic surfactant of the polyglycol family. In another embodiment the surfactant is a Triton. In yet another embodiment the surfactant is Triton X-100.

In zinc negative electrodes as described herein, the surfactant-coated carbon fibers are uniformly distributed across the electrode, i.e. upon visible examination with a microscope there are no apparent lumps or agglomerates. It is usually seen that the addition of the carbon fiber distributes uniformly in the entire electrode. Mixing is carried out with high shear blades to ensure good component distribution; microscopic analysis confirms uniform distribution of the carbon fiber. The uniform distribution forms a conductive matrix along with other active materials like zinc and bismuth oxide. The electrode with the carbon fiber will maintain better conductivity and connectivity during discharge/recharge cycles.

As mentioned, in some embodiments where lead is used to coat the zinc particles, the lead is less than about 0.05% by weight of the zinc negative electrode active material. The total amount of lead in the zinc negative electrode, active and other material, is less than about 0.05%. Carbon fibers as described herein can also be metallized with other metals. In one embodiment the carbon fiber is metallized with at least one of lead, tin, indium, bismuth, silver and mixtures or alloys thereof. In one embodiment, the carbon fibers are metallized with lead. In a more specific embodiment, carbon fibers are metallized by slurrying carbon fibers in a solution of metal salt. In an even more specific embodiment, carbon fibers are treated with a lead salt and/or a tin salt in order to metallize the fibers with lead and/or tin.

As mentioned, a slurry/paste having a stable viscosity and that is easy to work with during manufacture of the zinc electrode may be used to make the zinc negative electrode. Such slurry/pastes have zinc particles optionally coated by adding lead and tin salts to a mixture containing the zinc particles, a thickening agent and a liquid, for example water. Constituents such as zinc oxide (ZnO), bismuth oxide ($Bi_2O_3$), a dispersing agent, and a binding agent such as Teflon are also added. Binding agents suitable for this aspect of the invention include, but are not limited to, P.T.F.E., styrene butadiene rubber, polystyrene, and HEC. Dispersing agents suitable for this aspect of the invention include, but are not limited to, a soap, an organic dispersant, an ammonium salt dispersant, a wax dispersant. An example of commercially available dispersants in accord with this aspect of the invention is a Nopcosperse™ (trade name for a liquid series of dispersants available from Nopco Paper Technology Australia Pty. Ltd.). Liquids suitable for this aspect of the invention include, but are not limited to, water, alcohols, ethers and mixtures thereof.

Surfactant-coated particles may be incorporated in the zinc negative electrode. Also as mentioned, the particles may be carbon fibers, optionally metallized. Generally, the carbon fibers are coated with surfactant, and optionally a metal, and at some point added to other components to make a slurry/paste for application to the negative current collector. The carbon fibers may first be metallized, for example by exposure to a metal salt containing solution, plasma vapor deposition (PVD), chemical vapor deposition (CVD), and other methods known to one of ordinary skill in the art; and then exposed to surfactant. Or the carbon fibers may be treated with surfactant and then a metallizing process. Or the carbon fibers may be metallized and surfactant-coated in a single step.

In one example, the carbon fibers are coated by adding a metal salt and a surfactant to a mixture containing a thickening agent, and a liquid. The surfactant can be one as described above, for example a Triton. The metal salt can be any suitable metal salt, for example a lead salt, a tin salt, and the like. The counter ion of the metal salt can be chosen to aid in coating, for example those counter ions more soluble in the liquid. The thickening agent aides in formation of the ultimate paste or slurry used to form the electrode. Thickening agents include, but are not limited to, carboxymethylcellulose (CMC), hydroxyethylcellulose (HEC), hydroxylpropylmethylcellulose (HPMC), and the like. The liquid can be aqueous, organic or a mixture thereof. For example, water may be used alone or in combination with an alcohol or ether to aide in solubilizing and/or suspending the components of the mixture. A thixotropic agent may optionally be added. In a specific example, carbon fibers are coated by combining them with a lead salt, for example lead acetate, CMC, and Triton X-100 in water. In another embodiment, carbon fiber is treated with Triton X-100 separately in a 2% aqueous solution for 12 hours. Then a metal salt, for example lead acetate, is added along with a thickening agent, for example CMC, to form a mixture where the carbon fibers are coated with surfactant. Alternatively, or also, the metallization process may take place when the mixture is added to a component of the paste containing zinc that provides the negative redox potential necessary for the oxide reduction to metal either on zinc or on fibers in contact with zinc.

The surfactant-coated carbon fibers are then incorporated into a zinc negative electrode by mixing with other agents to form a slurry/paste for application to a negative current collector. First, the remaining zinc electrode constituents such as zinc oxide (ZnO), bismuth oxide ($Bi_2O_3$), a dispersing agent, and a binding agent such as Teflon are added to the fiber coating mixture. Then, the resulting slurry is incorporated into the negative electrode. Other additives, such as an insoluble corrosion inhibiting agent, may be included to form the slurry/paste used to coat the negative current collector. These constituents may be in a pre-mixed powder form when added to the slurry, forming a slurry or paste that may be worked after mixing. An aspect of the manufacturing of the negative electrodes is the slurry and paste's stability over the time period of manufacturing. In various embodiments, the paste/slurry should be stable over the time period from slurry preparation to pasting on the substrate—a process that may take 4-6 hours or more. The addition of minute quantities of lead and/or tin is found to make the paste/slurry stable. In certain embodiments, the soluble lead and soluble tin may be added separately.

Some methods of fabricating a zinc negative electrode may be characterized as follows: (i) coating lead and/or tin onto zinc particles including at least one of zinc and zinc oxide; (ii) coating carbon particles with a surfactant to make surfactant-coated carbon particles; (iii) forming a paste from the coated zinc particles, surfactant-coated carbon particles, bismuth oxide, a dispersing agent, a binding agent, and a liquid; and (iv) incorporating the paste into a zinc electrode. Methods described herein for coating carbon particles, particularly carbon fibers are applicable to this method. Binding agents suitable for this aspect of the invention include, but are not limited to, P.T.F.E., styrene butadiene rubber, polystyrene, and HEC. Dispersing agents suitable for this aspect of the invention include, but are not limited to, a soap, an organic dispersant, an ammonium salt dispersant, a wax dispersant. An example of commercially available dispersants in accord with this aspect of the invention is a Nopcosperse™ (trade name for a liquid series of dispersants available from Nopco Paper Technology Australia Pty. Ltd.). Liquids suitable for this aspect of the invention include, but are not limited to, water, alcohols, ethers and mixtures thereof.

In another embodiment, a method of fabricating a zinc negative electrode includes: (i) treating carbon particles with a surfactant to produce surfactant-coated carbon particles; (ii) combining the surfactant-coated carbon particles with, at least, electrochemically active zinc to produce an evenly dispersed mixture; and (iii) coating a substrate current collector with the evenly dispersed mixture. In one embodiment the carbon particles are carbon fibers. In another embodiment, the substrate current collector is heated after being coated with the evenly dispersed mixture. In one embodiment, the substrate current collector coated with the evenly dispersed mixture is subjected to a burn out procedure in which the zinc electrode may be heated for up to an hour at temperatures as high as 400° C. In some embodiments, the electrode is heated under inert atmosphere to between about 250° C. and about 300° C. for between about 30 minutes and about 60 minutes. In another embodiment, the substrate current collector is heated under inert atmosphere to about 260° C. for about 45 minutes. In some embodiments where electrodes are fabricated with a burn out step, the burn out step may remove some of the surfactant. Optimally, the conditions are chosen so as not to remove all the surfactant. Since surfactants, for example Tritons, are commercially available in varying molecular weights, particular surfactants can be chosen, for example, by their molecular weight so as to ensure they are not completely removed during burnout. In one example, the pasted current collector is heated to between about 200° C. and about 400° C. for between about 30 minutes and about 120 minutes. In another example, the pasted current collector is heated to between about 250° C. and about 300° C. for between about 30 minutes and about 60 minutes. In a specific example, where Triton X-100 is used as the surfactant, the pasted current collector is heated to about 260° C. for about 45 minutes (the boiling point of Triton X-100 is about 270° C.). This heating process is done in air but may also be done under inert atmosphere or under vacuum to limit oxidation of the current collector material (for example copper) and decomposition of the surfactant.

Typically the substrate is allowed to cool to about ambient temperature prior to integrating the zinc negative electrode into, for example, a jellyroll electrode assembly of a nickel zinc battery. In one embodiment, such a jellyroll assembly includes a nickel positive electrode (as described above) wound with the heat treated zinc negative electrode. Surfactants suitable for this embodiment include those described herein, both non-ionic and ionic.

Regarding pencil cell configurations, a negative electrode current collector is positioned in the gelled negative electrode, for example as described in relation to FIG. 2. Considerations are made to maximize current collecting efficiency while taking into account manufacturing cost. In one implementation, the negative electrode current collector is made of at least one or alloy of brass, copper, steel, and combinations thereof. In some embodiments, the negative current collector optionally includes a hydrogen evolution inhibitor. Hydrogen evolution inhibitors as described herein include at least one of tin, lead, bismuth, silver, indium, and carbon. Some of the materials used in the current collector may form only a surface coating. In such embodiments, the coating may be applied by plating (electroplating and electroless plating), painting, spraying, and the like.

Typically, but not necessarily, the negative electrode current collector is configured as a "nail" type structure, inserted into the gelled negative electrode. The "nail" is a narrow substantially cylindrical shape, optionally tapered toward the end furthest into the gelled electrode.

The balance between current collecting efficiency and the amount of active material in the gelled negative electrode is important. When the current collector is substantially cylindrical in shape, the diameter and the length of the current collector actually in contact with the gelled negative electrode determine the interfacial surface area between the current collector and the gelled negative electrode. In some implementations, the diameter of the current collector is between about 5% and about 20% of the diameter of the battery, or between about 10% and about 15% of the diameter of the battery, or between about 10% and about 12% of the diameter of the battery. The length of the current collector actually in contact with the gelled negative electrode therefore is an important parameter. Given the current collector diameters described above, in some embodiments, the length $L^1$ of the gelled negative electrode in the separator (residing in the hollow cylindrical positive electrode) and the length $L^2$ corresponding to the portion of the negative electrode current collector positioned in the gelled negative electrode satisfy the relation: $0.5 \leq L^2/L^1 \leq 0.95$, or $0.6 \leq L^2/L^1 \leq 0.9$, or $0.75 \leq L^2/L^1 \leq 0.85$.

In other embodiments, it is desirable to change the shape of the negative electrode current collector to increase surface area and thus current collector efficiency. In some embodiments, the negative electrode current collector includes a surface area enhancing geometrical element. Thus, the current collector can include fins, mesh, perforations, spirals, coils, zig-zags, ridges, and combinations thereof. In one embodiment the current collector is a perforated plate or cylinder. In another embodiment the current collector is a rigid mesh, formed by, for example, compressing a metal or alloy mesh into a current collector. In another embodiment the current collector is a perforated plate or cylinder (to provide rigidity) with a mesh or foam on and/or inside (in the case of the cylinder) the perforated metal surface. With such embodiments that increase surface area, the diameter of the current collector becomes less important but the length of the current collector inserted into the gelled electrode remains important to maximize the amount of gelled electrode available for charging, discharging and recharging. Thus, current collectors as described herein with increased surface area (relative to a simple cylindrical shape) due to the surface area enhancing geometrical element may be of smaller average diameter than those described above for substantially cylindrical current collectors.

Finally, the pencil batteries described herein include a negative electrode terminal plate electrically connected to the negative electrode current collector. The terminal plate is integrated into the closure 206 as described in relation to FIG. 2.

As mentioned, the surfactant-coated particles, be they conductive ceramic, metal, carbon or other, can be used both in jellyroll electrode configurations or pencil cell electrode configurations. Jellyroll zinc negative electrode fabrication processes suitable for negative electrodes of this invention are further described in U.S. patent application Ser. No. 10/921,062, published as US 2005-0064292 A1, entitled "Methods of Manufacturing Nickel-Zinc Batteries," by J. Phillips and J. Zhao, filed Aug. 17, 2004, which is hereby incorporated by reference for all purposes.

Performance of the Zn Electrode and Batteries

Sealed rechargeable Ni—Zn batteries have been developed for high power applications, such as power tools and hybrid electric vehicles. These batteries show exceptional high-rate charge and discharge capability with maximum power densities in excess of 2000 W/kg.

As mentioned, the use of surfactant-coated fibers in the negative electrode of a nickel-zinc cell improves high rate performance and increases cycle life. It has been found that the use of carbon fibers improves the conductivity of the negative electrode and appears to also fulfill the function of expensive (due to for example sieving steps) alumina fibers for irrigating the electrode.

Battery cells employing the zinc electrodes containing conductive particles, particularly fibers, as described herein provide excellent performance in multiple areas. For example, they provide long cycle life when used in high rate applications such as power tools, lawn and gardening tools, and electric vehicles (including hybrid electric vehicles). In certain embodiments, the cells provide at least about 250 charge-discharge cycles when operated at consistently high rates (for example, at least about 5 C discharge rate or at least about 10 C charge rate, or even at least about 25 C). In some cases, they provide at least about 500 cycles (and even up to 700 or more cycles) under the same high rate conditions.

In addition, shape change appears improved in the high rate carbon fiber cell compared to a control cell. The carbon fiber also provides benefits during electrode pasting. The natural tendency of the carbon particles to evolve hydrogen gas at the zinc potential is controlled in this invention through the use of surfactants and lead, tin, or lead—tin coating. The surfactant also helps promote better irrigation of electrolyte throughout the electrode mass.

EXPERIMENTAL

Example 1. Test Cells

Compositions 1 and 2 were used to paste negative current collectors and make jellyroll-type nickel zinc cells as follows:

Composition 1 (Test): Carbon fiber (100 parts by weight, 100 micron mean length, 7 micron mean diameter, available from Toho Tenax America of Rockwood Tenn.) were coated with 200 parts by weight of 2% aqueous solution of Triton X-100. Hydroxyethylcellulose (20 parts by weight), and 1.4 parts by weight of lead salt are dissolved in 1400 parts by weight water and this was added to the mix. Also added were: 3000 parts by weight of ZnO, 97 parts by weight of $Bi_2O_3$, 16 parts by weight of $Ca(OH)_2$, 240 parts by weight of an aqueous slurry containing 60% Teflon binder, and 900 parts by weight of metallic zinc powder.

Composition 2 (Control): It is identical to Composition 1, but with alumina fiber and without carbon fiber, lead or Triton X-100.

Each of compositions 1 and 2 were applied to a negative current collector substrate to ultimately make standard sub-C size cells, keeping all other components the same. The cells employed an electrolyte having a composition of 760 g $H_2O$, 1220 g 45% potassium hydroxide solution, 84.7 g sodium phosphate ($Na_3PO_4.12H_2O$), 59 g sodium hydroxide, 16.8 g lithium hydroxide, 3.2 g zinc oxide (ZnO). A microporous 50 micron separator manufactured by UBE and a cellulose—polyvinyl alcohol wicking separator were used in between the two electrodes.

The positive electrodes were prepared with nickel hydroxide that included a cobalt (III) coated layer that provided inter-particle conductivity. Cobalt metal powder (2%) and nickel powder (9%) was added to the positive paste mix to provide additional conductivity for high discharge rate capability. During the 1-2 hour soak times that exist between filling the cell and the application of the first formation charge the added cobalt can dissolve and migrate to the negative electrode. The positive electrode for cells relating to data in FIGS. 8-13 used 0% cobalt, 5% nickel, 0.2% Ca(OH)2 and 0.5% yttrium oxide.

The formation of all cells listed above was carried out identically. Formation of cells refers to the initial electrical charging. Each cell was charged at 91 mA for 20.5 hrs and discharged at 1 A to 1.0V. Then they were charged at 0.1 A for 18 hrs and at 0.075 A for 6.5 hrs. The cells were then tested for cycling and gassing. The cycling behavior is discussed below in relation to the figures.

Figure 4A:
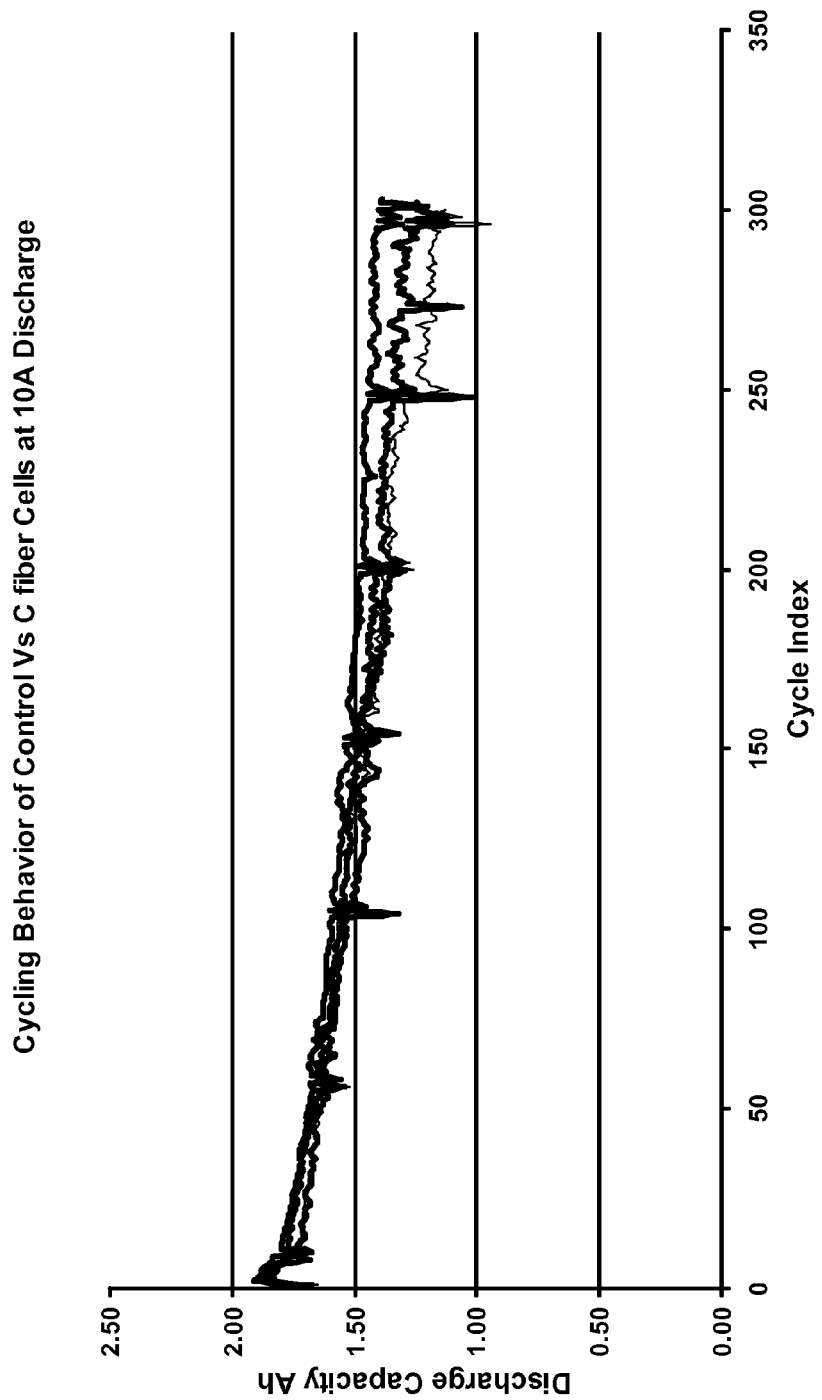
FIGS. 4A and 4B show cycling behavior of control cells (with alumina fiber) vs surfactant-coated carbon fiber cells.
Figure 4B:
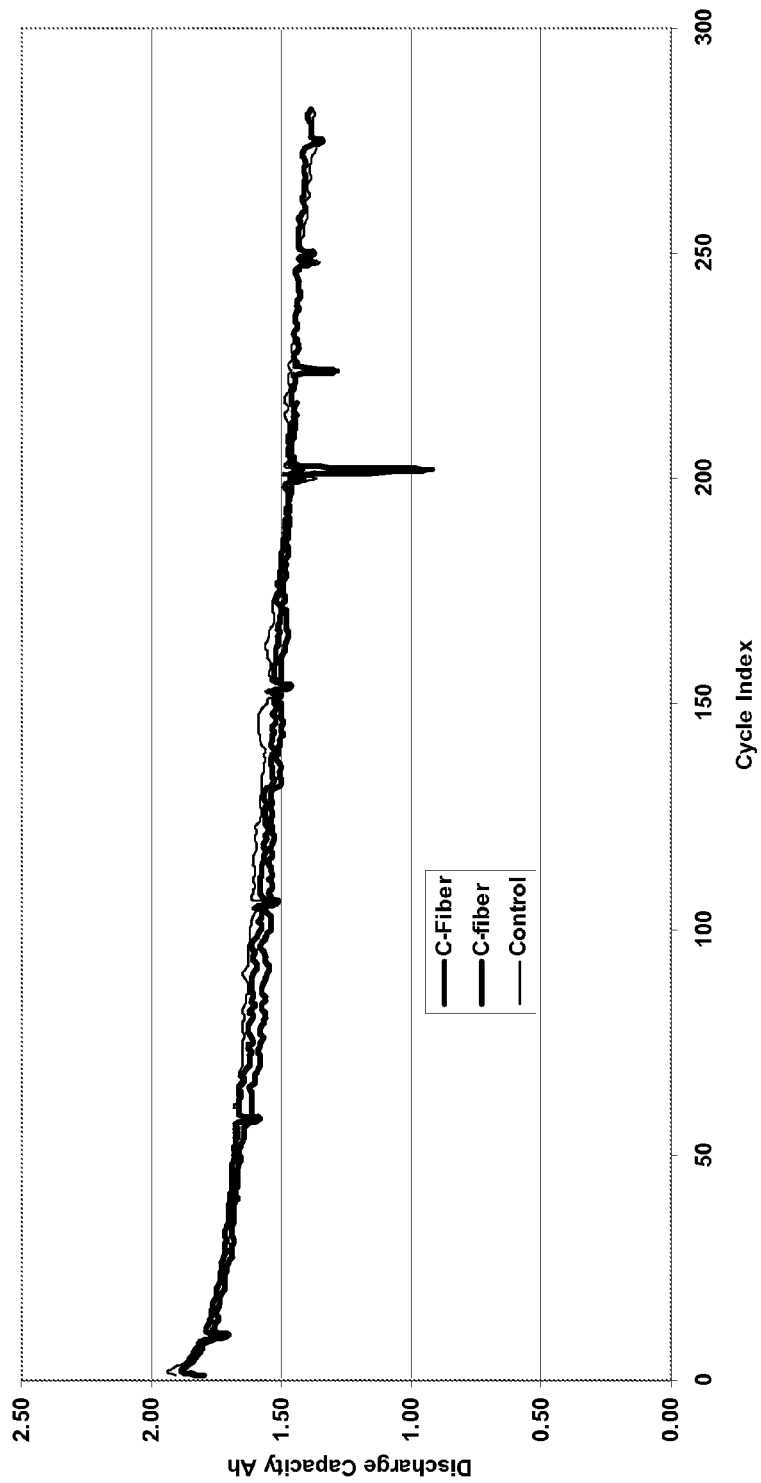
Figure 5A:
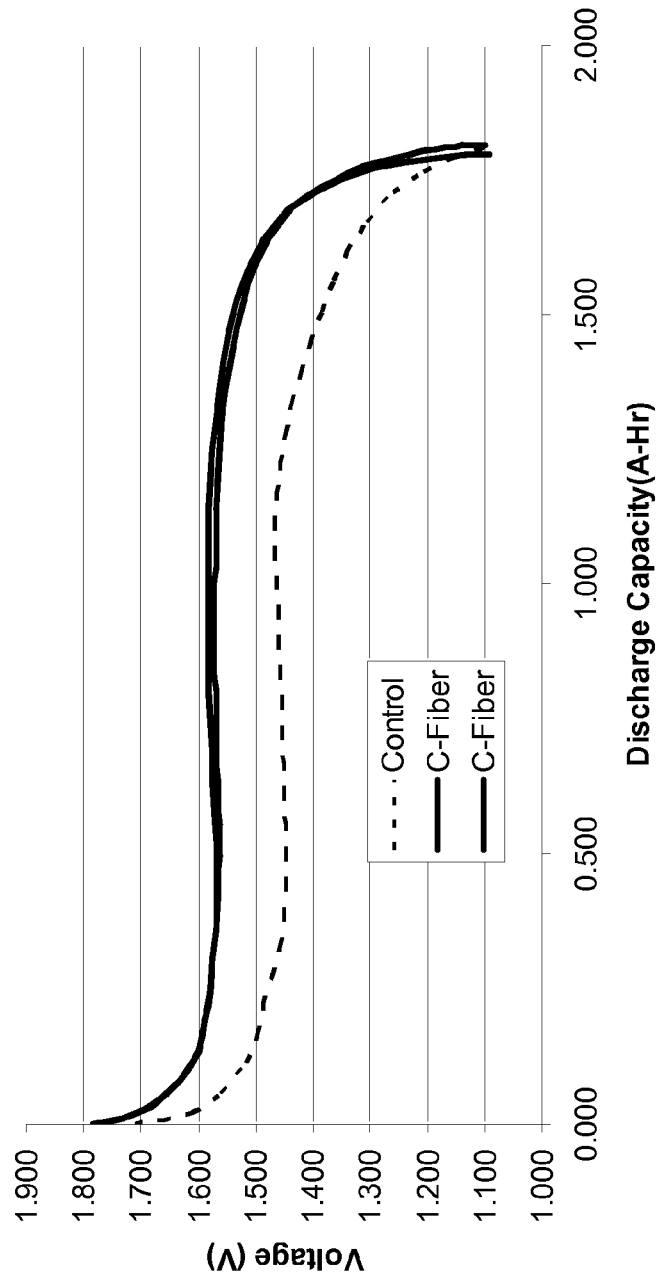
FIGS. 5A-5D are graphs of voltage (V) vs discharge capacity (A-Hr) where measurements were taken on a 20 amp discharge curve at 8, 54, 104 and 152 cycles.
Figure 5B:
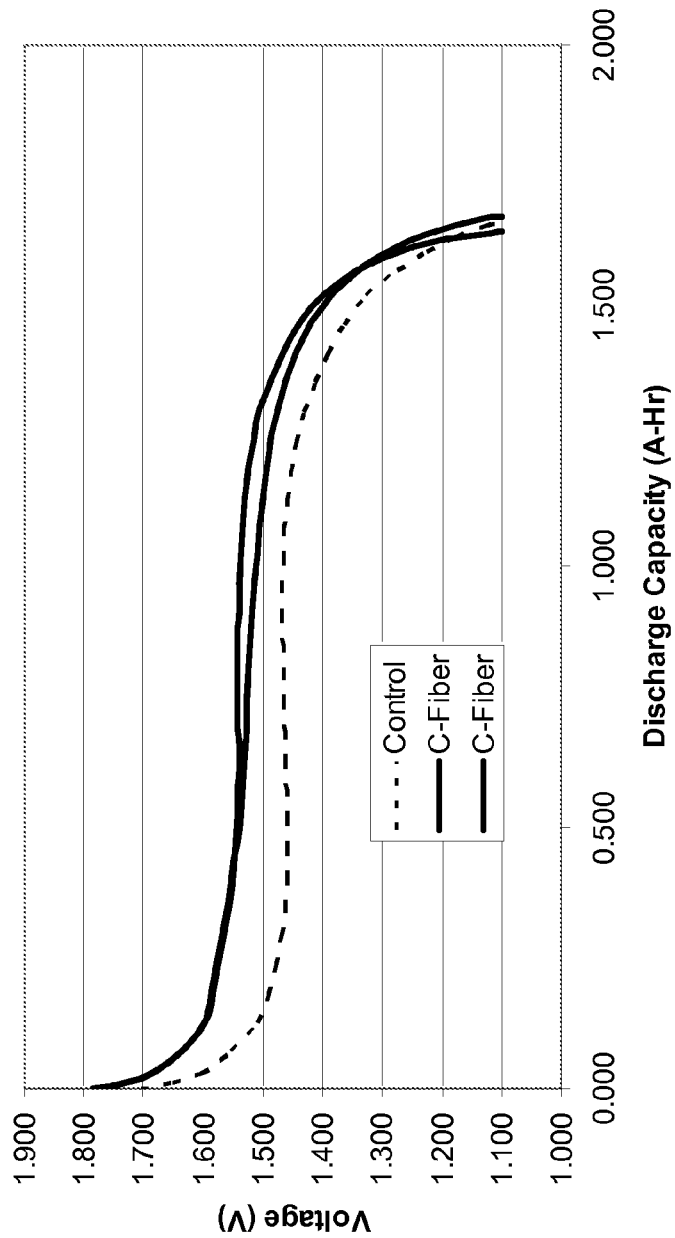
Figure 5C:
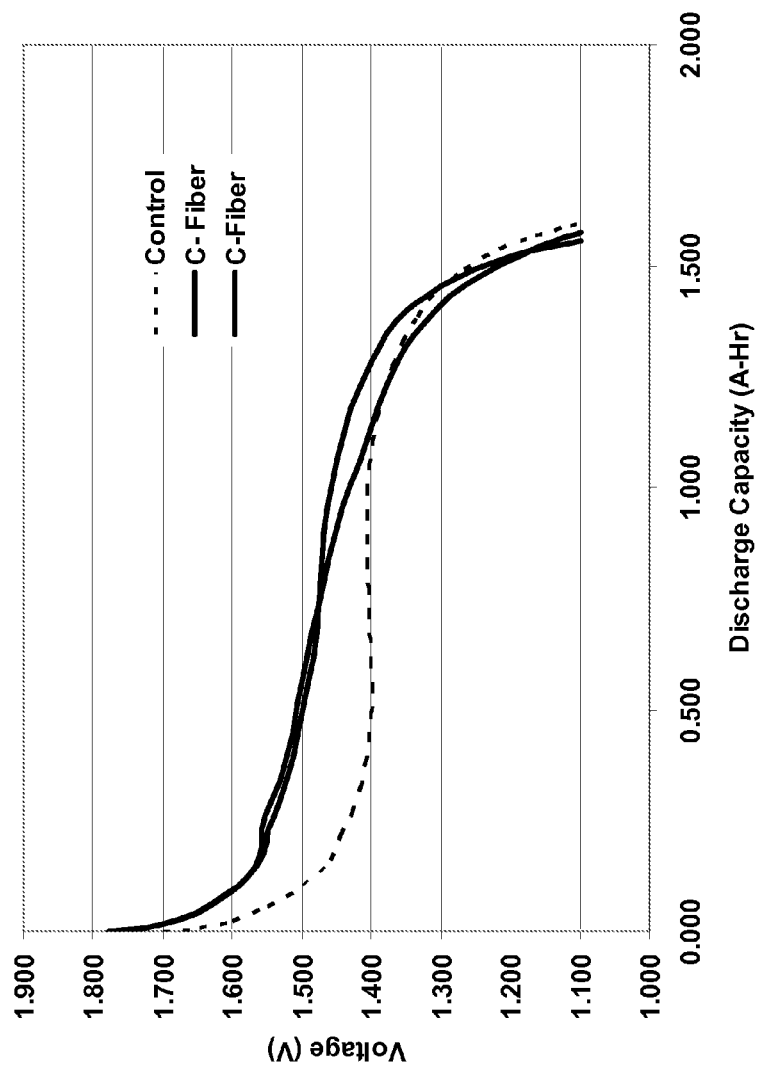
Figure 5D:
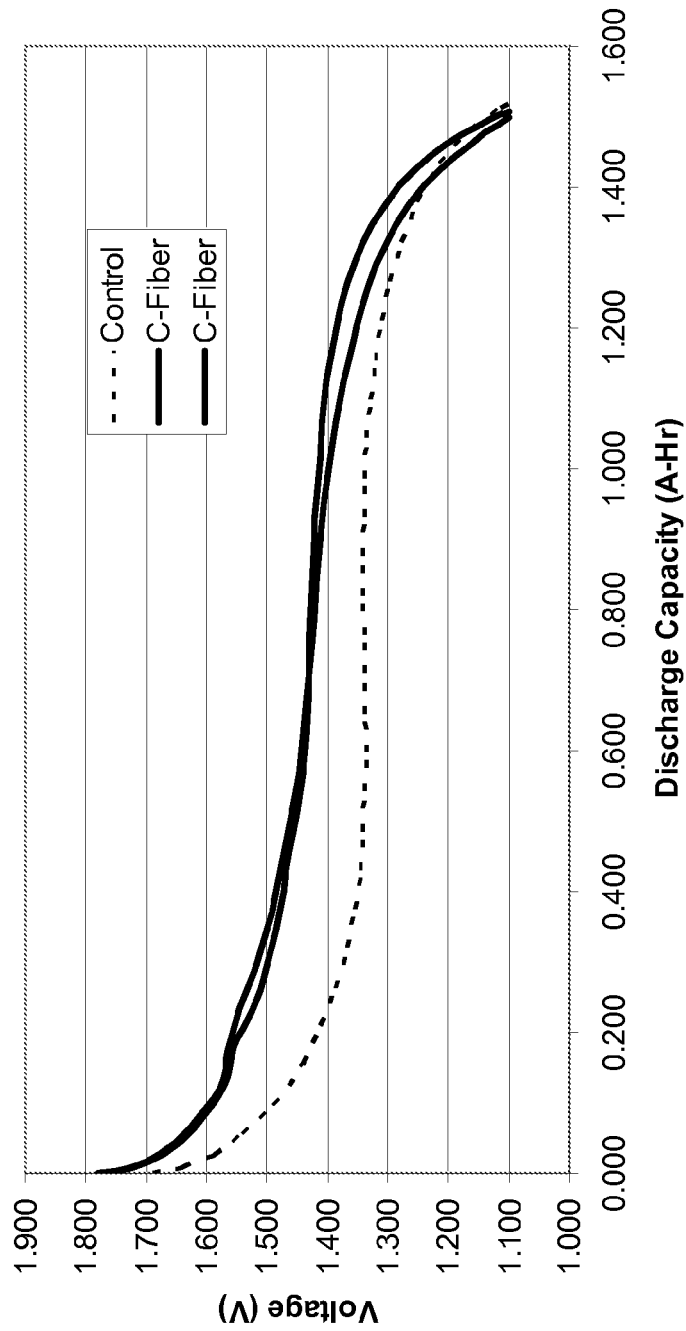

In the control cells, fibers like alumina were used for irrigating the negative electrode to keep the electrode wet during the cell operation. By introducing the hydrophilic surfactant-coated carbon fiber in the negative electrode, it serves a better irrigation and also provides good electronic conductivity. FIG. 4A shows cycling behavior of a control cell (with alumina fiber) vs surfactant-coated carbon fiber cells as described herein at 10 amp discharge. The top two curves in FIG. 4A are test cell curves (thicker lines). The control cell curve is the bottom curve (thinner line). FIG. 4B shows cycle life of a control cell (with alumina fiber, thin line) compared with cells with surfactant-coated carbon fibers at both 10 amp and 20 amp discharge (20 amp discharge every 50 cycles, with a 24 hour rest period). FIGS. 4A and 4B demonstrate that cycling behavior of surfactant-coated carbon fiber cells is comparable to control cells with (non-conductive) alumina fiber.

Figure 6:
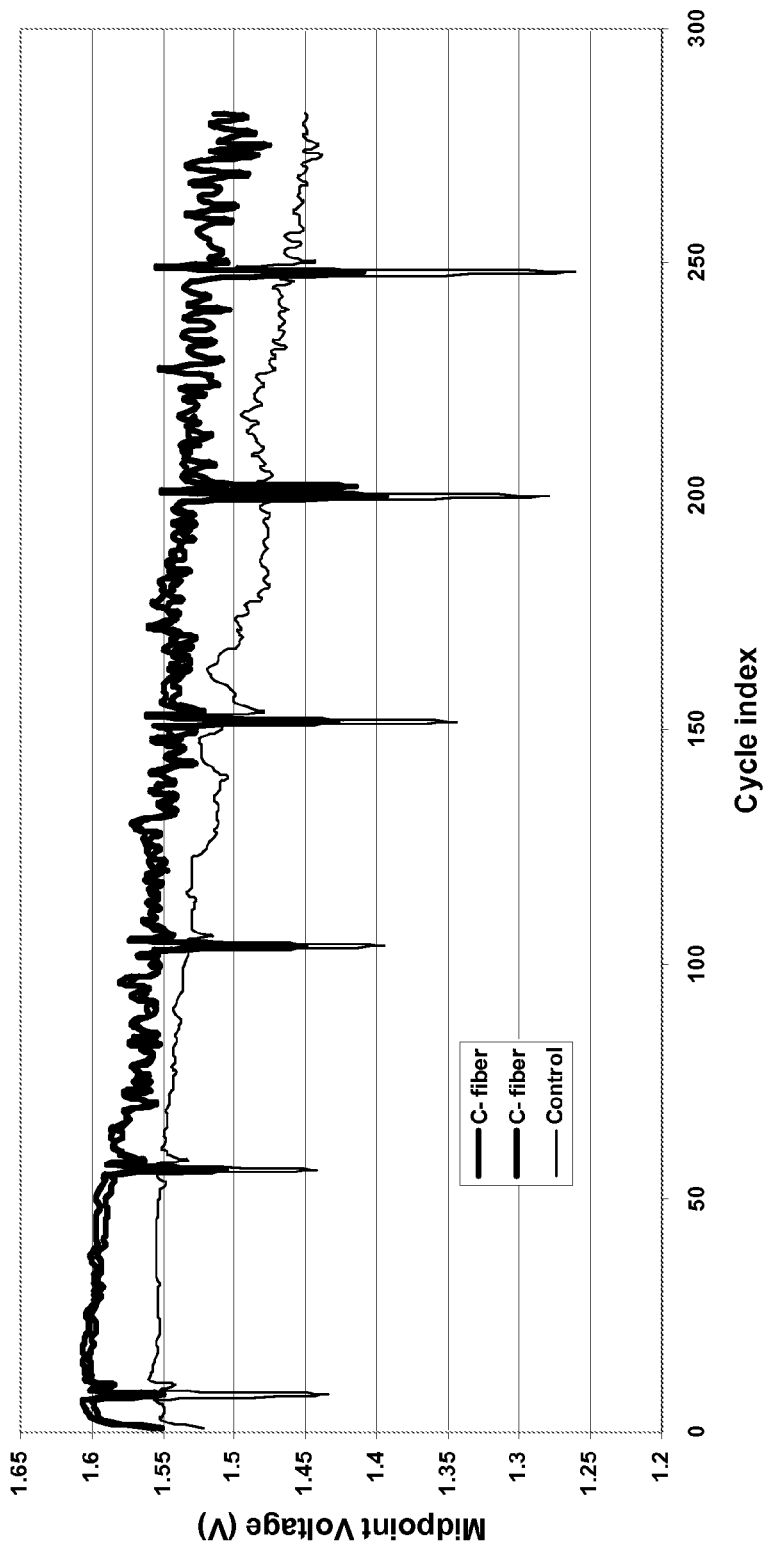
FIG. 6 shows comparison of mid-point voltage of control cells and cells containing surfactant-coated carbon fibers under 10 amp and 20 amp discharge.

FIGS. 5A-5D are graphs of voltage (V) vs discharge capacity (A-Hr) where measurements were taken on a 20 amp discharge curve at 8, 54, 104 and 152 cycles, respectively. Cells containing surfactant-coated carbon fiber electrodes were compared to cells with negative electrodes containing alumina fibers (dotted curves are controls). It was found that surfactant-coated carbon fiber improves high discharge performance especially at currents above the 10 C rate. The cell voltage is significantly improved by the carbon fibers owing to improvement in the conductivity of the electrode structure and better connectivity of the electroactive materials. This reduces the ohmic drop in the electrode and improves the degree of participation of all electroactive materials. FIG. 6 shows comparison of mid-point voltage of the control cell (thin line curve) and the cells containing surfactant-coated carbon fibers under 10 amp and 20 amp discharge (20 amp (10 C) at every 50$^{th}$ cycle). The mid-point voltage is the voltage when 50% of the full capacity is drained. Since it is determined by the operating voltage of both electrodes, it is a reflection of the overall voltage polarization at this point. A high mid point voltage that is invariant as the cell cycles is an indication that the electrodes are undergoing minimal physical changes. The mid-point voltage is significantly higher in the carbon fiber cells and the improvement is maintained over 250 cycles.

Figure 7:
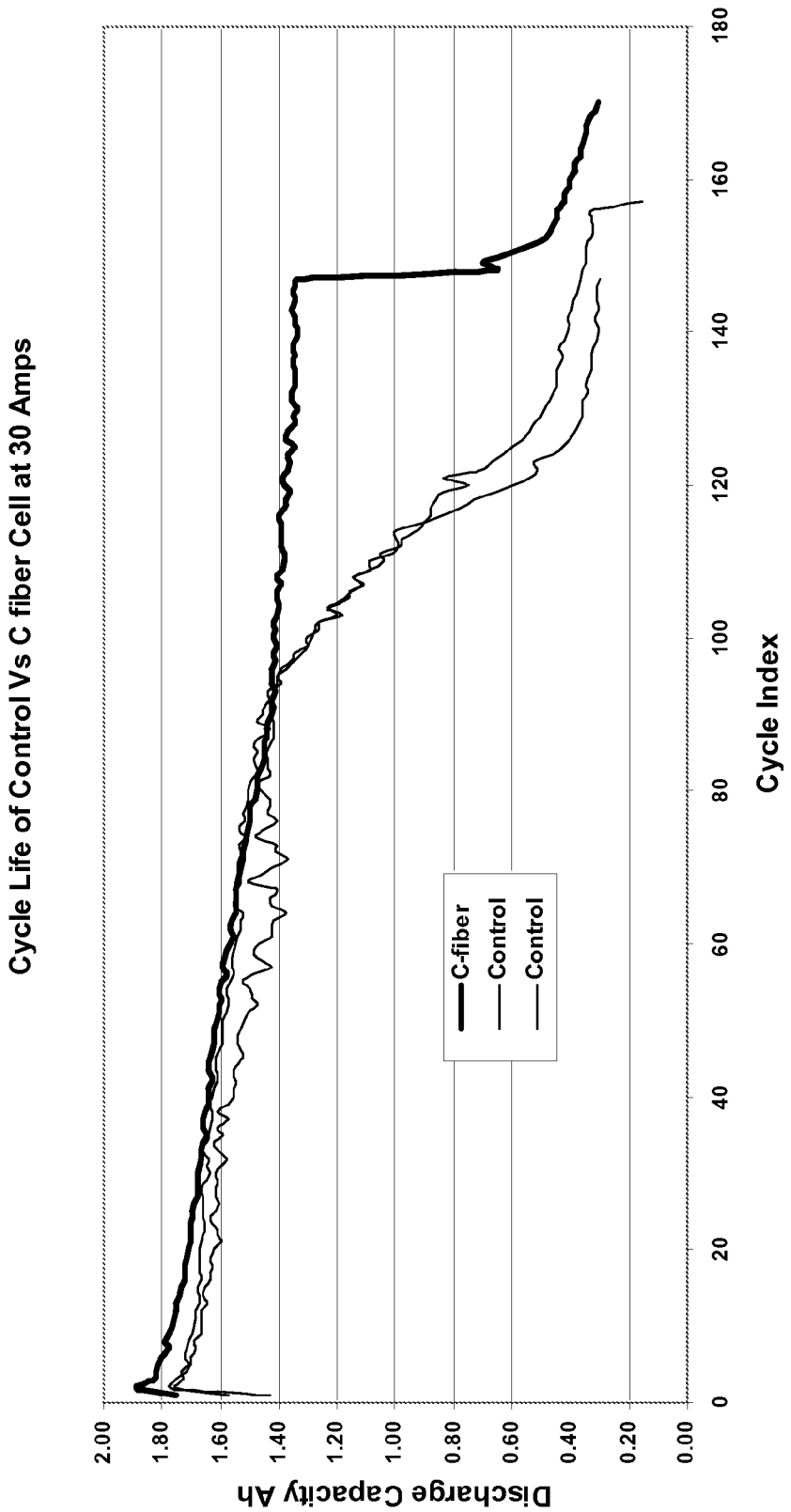
FIG. 7 shows discharge capacity vs cycle index for control cells and a cell containing surfactant-coated carbon fibers under 30 amp discharge (15 C).

FIG. 7 shows discharge capacity vs cycle index for control cells (bottom two thin curves) and a cell containing surfactant-coated carbon fibers under 30 discharge (15 C). The curves are comparable over about 80 cycles, but thereafter the carbon fiber cell shows significant improvement in maintaining discharge capacity, especially from 80 up to 150 cycles.

Figure 8:
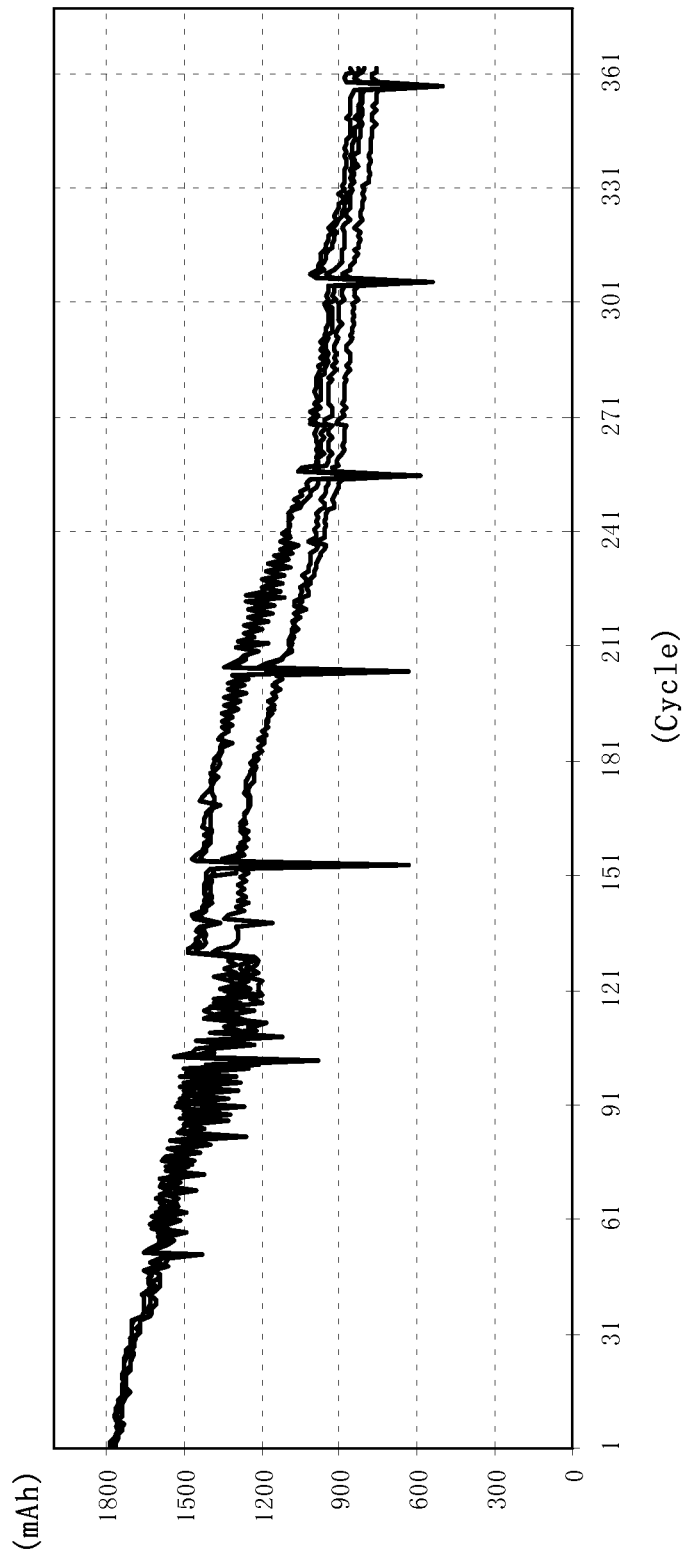
FIG. 8 shows discharge capacity vs cycle index for control cells containing alumina fiber at 20 amp and 30 amp (every 50 cycles) discharge (10 C and 15 C).

FIG. 8 shows discharge capacity vs cycle index for control cells (4 runs) containing alumina fiber at 20 amp and 30 amp (every 50 cycles) discharge (10 C and 15 C). From the data, it can be seen that the curves drop below 1200 mAh after about 211 cycles.

Figure 9:
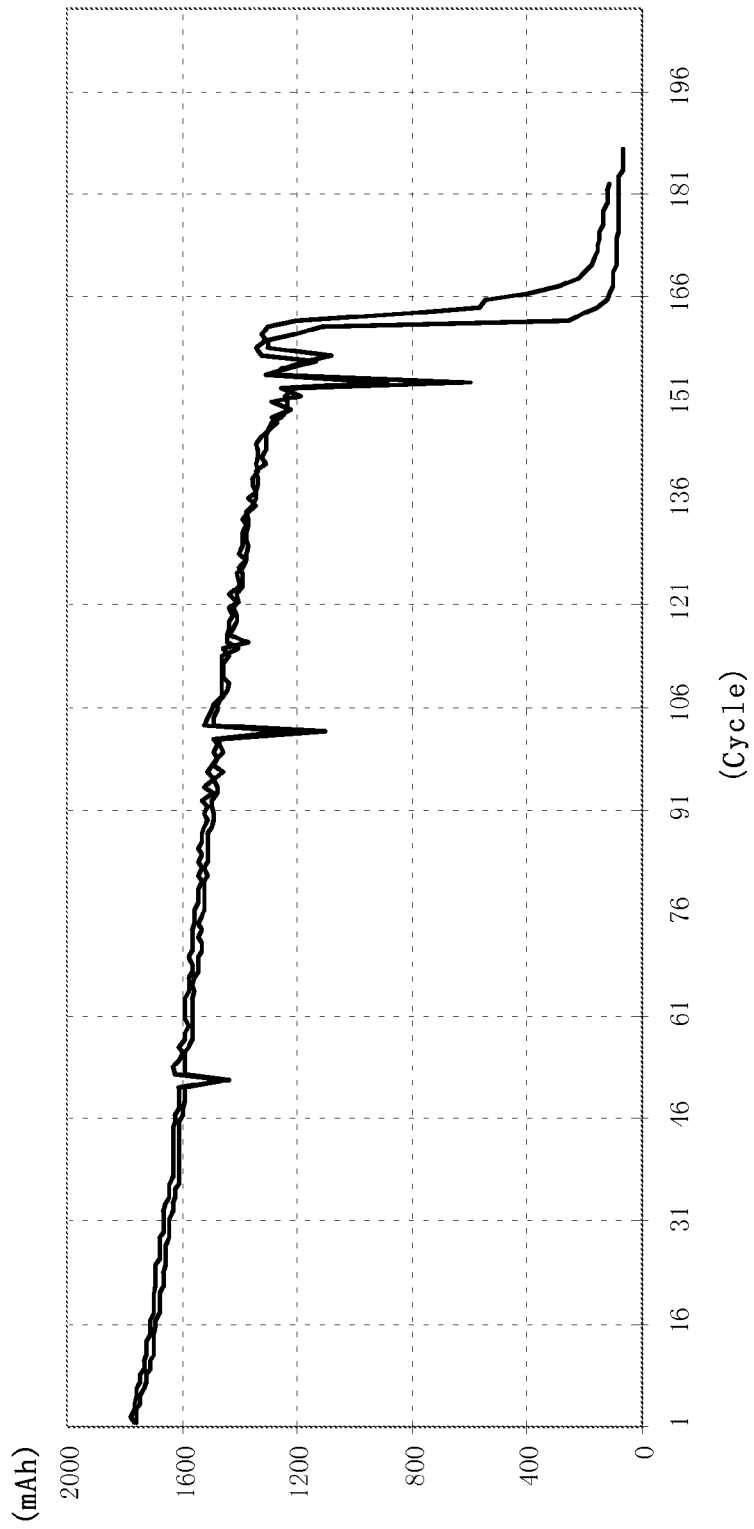
FIG. 9 shows discharge capacity vs cycle index for control cells as in FIG. 8, in a 6-cell pack at 20 amp and 30 amp (every 50 cycles) discharge (10 C and 15 C).

FIG. 9 shows discharge capacity vs cycle index for control cells as in FIG. 8, in a 6-cell pack at 20 amp and 30 amp (every 50 cycles) discharge (10 C and 15 C). The control cell packs under these conditions provided only about 160 cycles before output dropped well below 1200 mAh.

Figure 10:
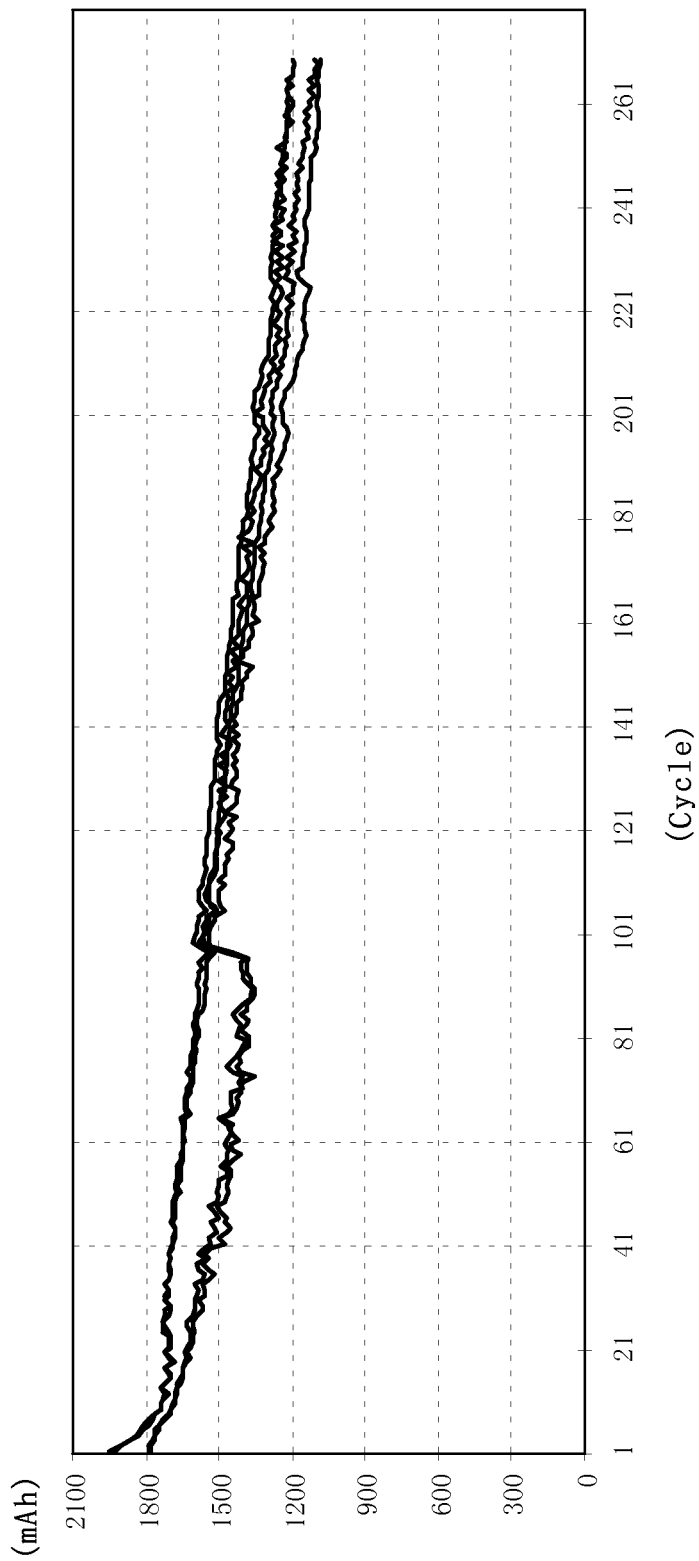
FIG. 10 shows discharge capacity vs cycle index for cells containing carbon fiber at 30 amp discharge (15 C).

FIG. 10 shows discharge capacity vs cycle index for cells containing carbon fiber at 30 amp discharge (15 C). This data demonstrates that the test cells performed at or about 1200 mAh for at least 260 cycles. Under these conditions, a constant 30 amp discharge, the cells perform well under considerable stress, as compared to the data in FIG. 8 showing that control cells under less stringent conditions maintain 1200 mAh for only about 211 cycles.

Figure 11:
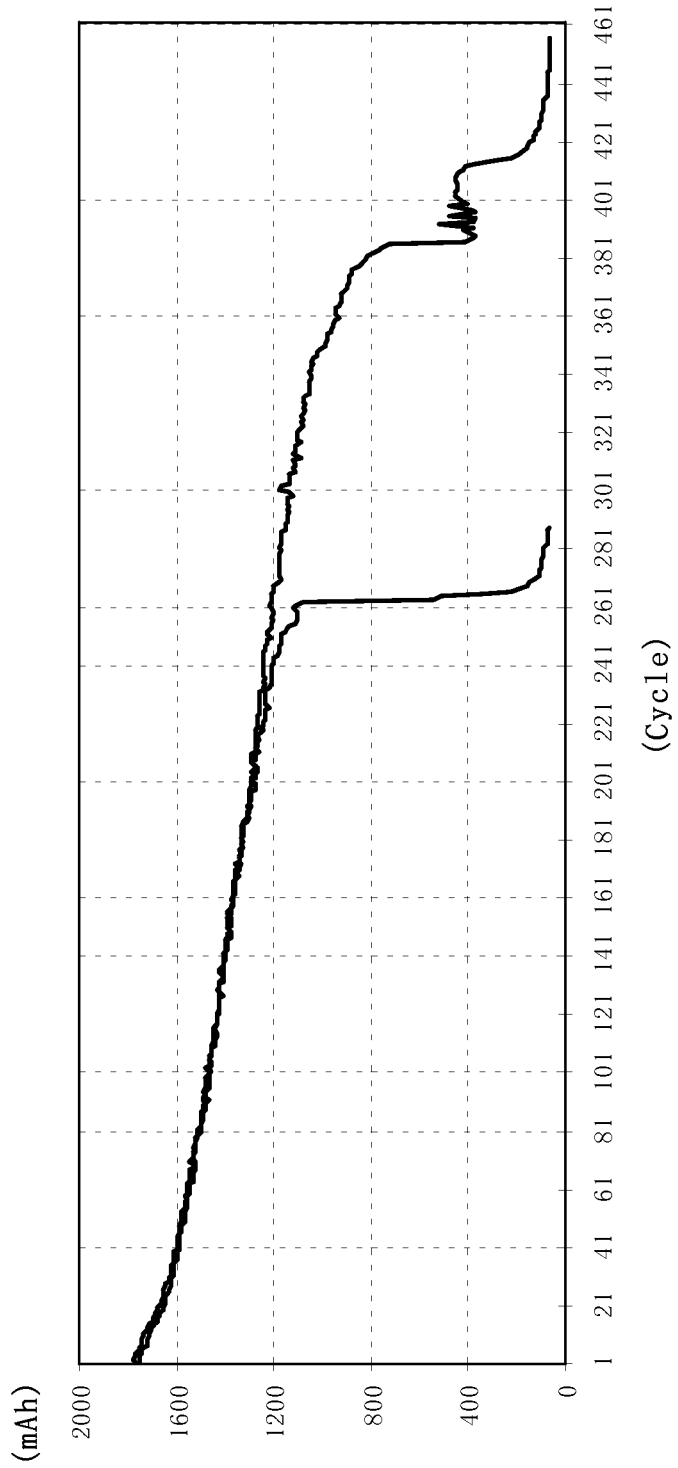
FIG. 11 shows discharge capacity vs cycle index for the cells as in FIG. 10, in a 9-cell pack at 20 amp discharge (10 C).

FIG. 11 shows discharge capacity vs cycle index for the cells as in FIG. 10, in a 9-cell pack at 20 amp discharge (10 C). This data demonstrates one pack providing about 1200 mAh for at least 240 cycles and nearly that level for another 20 cycles. The other pack maintained nearly 1200 mAh output for about 280 cycles and nearly that level for up to 340 cycles. Fifty percent of maximum theoretical output (2000 mAh) was still evident after 360 cycles.

Figure 12:
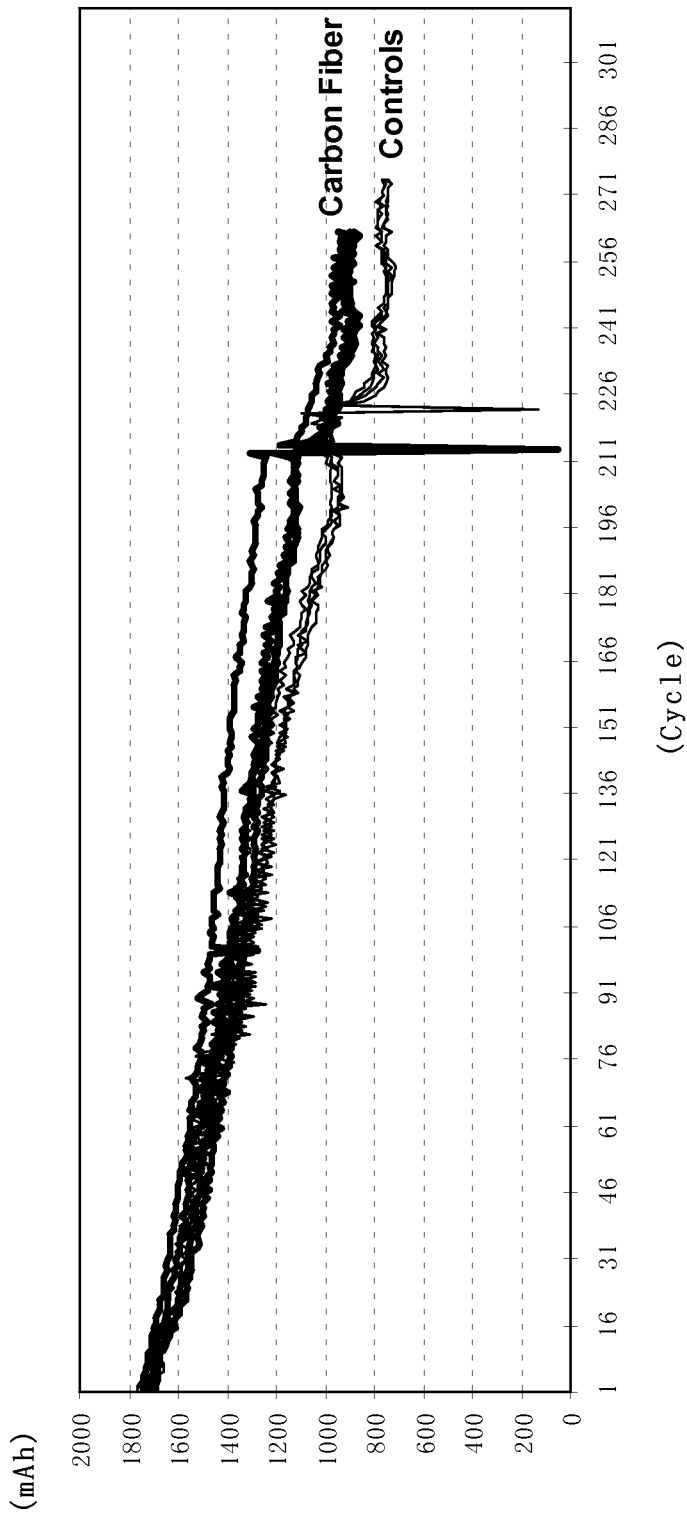
FIG. 12 shows control cells (alumina fiber) vs carbon fiber cells at 20 amp discharge (10 C).

FIG. 12 shows control cells (alumina fiber) vs carbon fiber cells at 20 amp discharge (10 C). Four test and control cells were run. The test cells (thick lines) with carbon fiber showed better performance relative to the control cells with alumina fiber.

Figure 13:
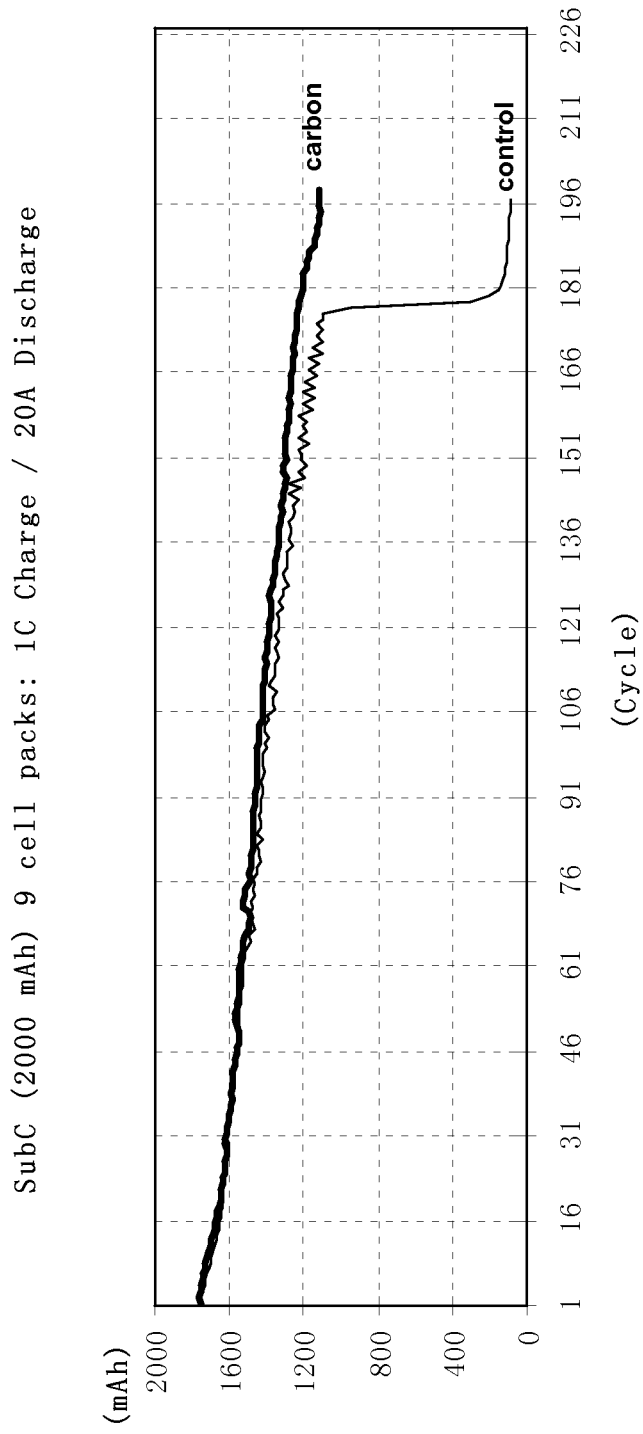
FIG. 13 shows control cells (alumina fiber) vs carbon fiber cells in 9-cell packs at 20 amp discharge (10 C).

FIG. 13 shows control cells (alumina fiber) vs carbon fiber cells in 9-cell packs at 20 amp discharge (10 C). The carbon fiber cells (thick curve) maintained 1200 mA output after 181 cycles and nearly as much out to 196 cycles. The control cell pack lost output after about 175 cycles.

Example 2. Reduction of Hydrogen Generation

Cells manufactured from electrodes along with lead, tin exhibit much less hydrogen gassing, by as much as 40-70%, than conventional cells. Further, carbon in an alkaline solution is prone to evolve hydrogen gas.

To determine the effectiveness of Triton coating on reduction of catalytic activity of carbon fiber to generate hydrogen gas in presence zinc and alkaline electrolyte, 0.5 g of carbon fiber was coated with 2 g of 2% aqueous Triton X-100. The coated carbon fiber along with five grams of zinc was then immersed in a solution with composition of 760 g $H_2O$, 1220 g of 45% potassium hydroxide solution, 84.7 g sodium phosphate ($Na_3PO_4.12H_2O$), 59 g sodium hydroxide, 16.8 g lithium hydroxide, and 3.2 g zinc oxide (ZnO).

TABLE 1

Gas Test Result of Carbon Fiber

| Sample | cc/Day |
|---|---|
| no carbon fiber (control) | 0.06 |
| carbon fiber (uncoated) | 0.43 |
| carbon fiber (coated) | 0.06 |

The gas generated due to the corrosion of zinc was collected and measured for three days. In parallel, the same test was carried out with uncoated carbon fiber in the same solution and with no fiber added to the solution (five grams of zinc was immersed without any fiber in the above mentioned solution which is used as a control). Table 1 shows that the Triton coated carbon fiber showed less gassing than the uncoated (on par with no carbon fiber added).

Result: Carbon fiber coated with 2% Triton and the lead salt exhibits less hydrogen gassing when compared with the no-fiber and uncoated fiber controls.

CONCLUSION

The conductivity of a zinc negative electrode is enhanced through use of surfactant-coated carbon fibers. Carbon fibers as described herein, along with other active materials such as bismuth oxide, zinc metal, etc., form an electronically conductive matrix in zinc negative electrodes. Zinc negative electrodes as described herein are particularly useful in nickel zinc secondary batteries. Cycling behavior of surfactant-coated carbon fiber cells is comparable to control cells with (non-conductive) alumina fiber, while surfactant-coated carbon fiber improves high discharge performance. The mid-point voltage is significantly higher in the surfactant-coated carbon fiber cells and the improvement is maintained over 250 cycles. Additionally, surfactant-coated carbon fiber cells show significant improvement in maintaining discharge capacity relative to control cells.

What is claimed is:

1. A rechargeable nickel zinc cell comprising:
   i) a zinc negative electrode comprising electrochemically active zinc and surfactant-coated carbon fiber, wherein the surfactant is selected from the group consisting of a polyglycol non-ionic surfactant, a poloxamer and a fluorosurfactant;
   ii) a nickel positive electrode; and
   iii) an aqueous alkaline electrolyte.

2. The nickel zinc cell of claim 1, wherein the electrochemically active zinc comprises at least one of zinc and zinc oxide.

3. The nickel zinc cell of claim 2, wherein the electrochemically active zinc is in the form of particles less than about 40 microns in size coated with tin and/or lead.

4. The nickel zinc cell of claim 3, wherein the zinc negative electrode active material comprises lead in amount of less than about 0.05% by weight.

5. The nickel zinc cell of claim 1, wherein the zinc negative electrode comprises less than 3% by weight of the carbon fiber by dry weight of the negative electrode.

6. The nickel zinc cell of claim 5, wherein the carbon fiber is between about 10 μm and 500 μm in length, and between about 1 μm and 50 μm in diameter, with a ratio of length to width of between about 50:1 and about 10:1.

7. The nickel zinc cell of claim 5, wherein the carbon fiber is metallized with at least one of lead, tin, indium, bismuth and silver.

8. The nickel zinc cell of claim 5, wherein the nickel positive electrode comprises cobalt and/or a cobalt compound.

* * * * *